April 3, 1962 H. W. R. MOELLER ET AL 3,027,559
STUD PLANTING APPARATUS
Filed Oct. 26, 1959 11 Sheets-Sheet 3
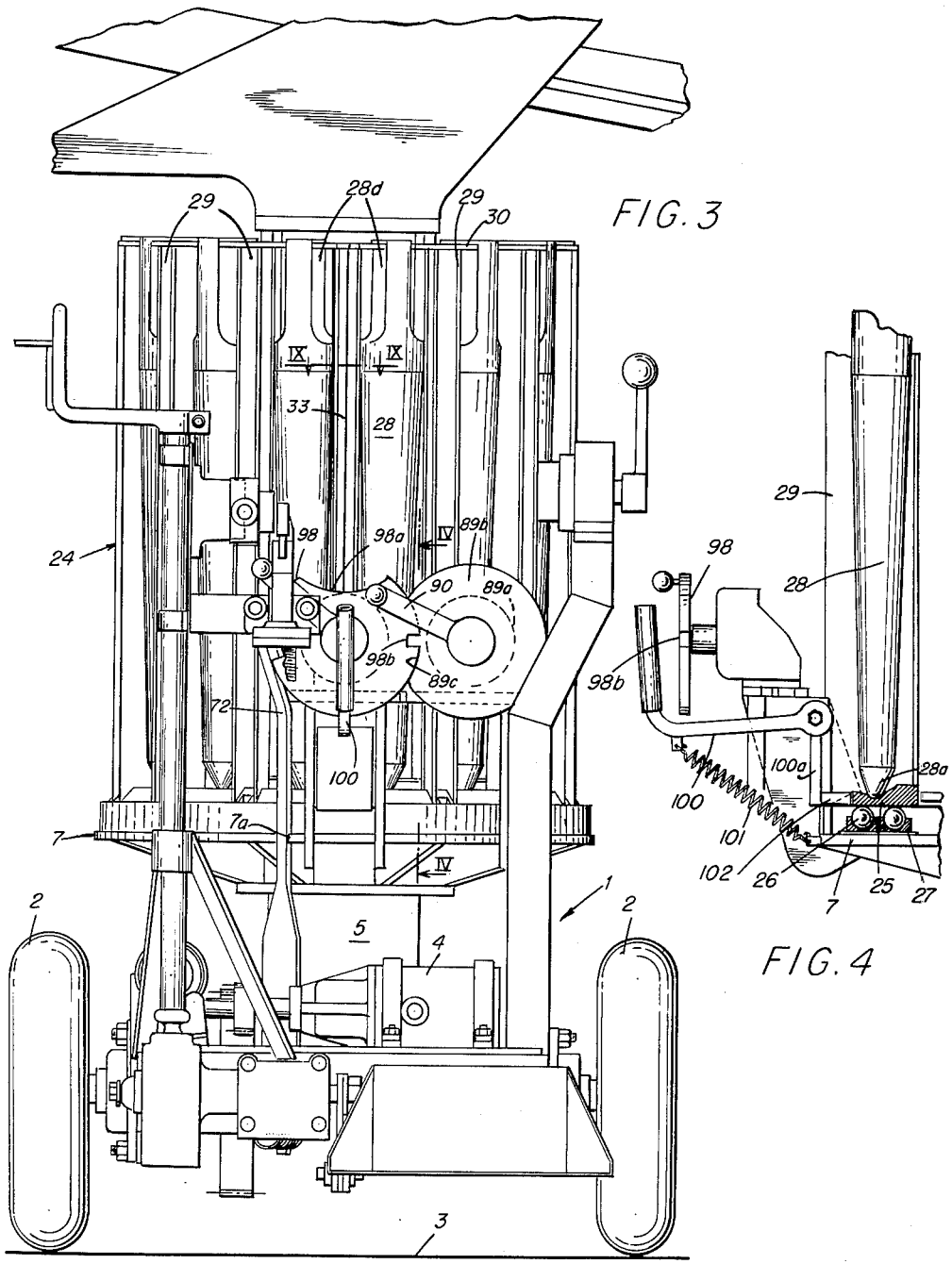
INVENTORS
Heinrich Wolfgang Reinhard Moeller
Philip Ivor Powis
By Robert S. Dunham
Attorney

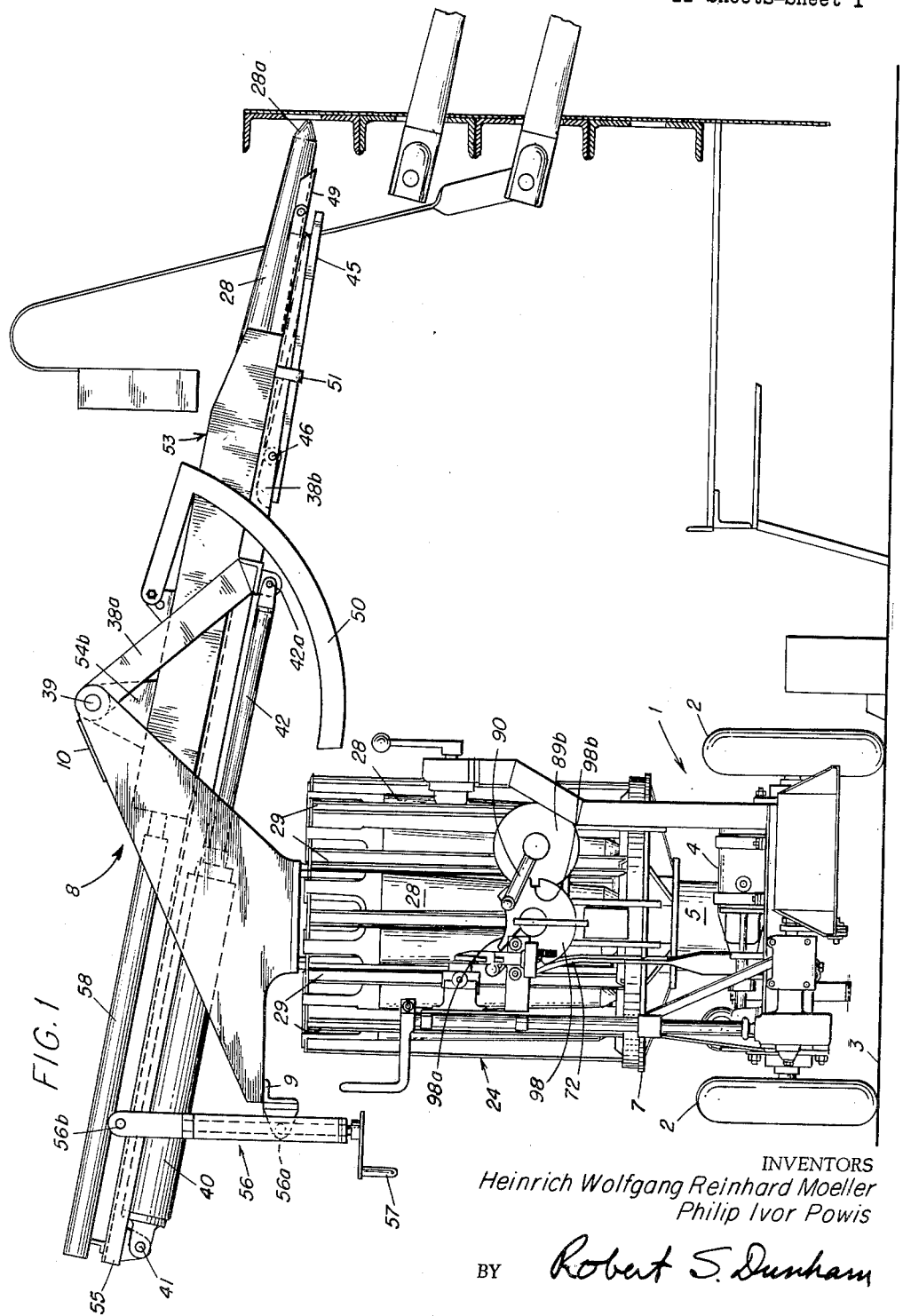

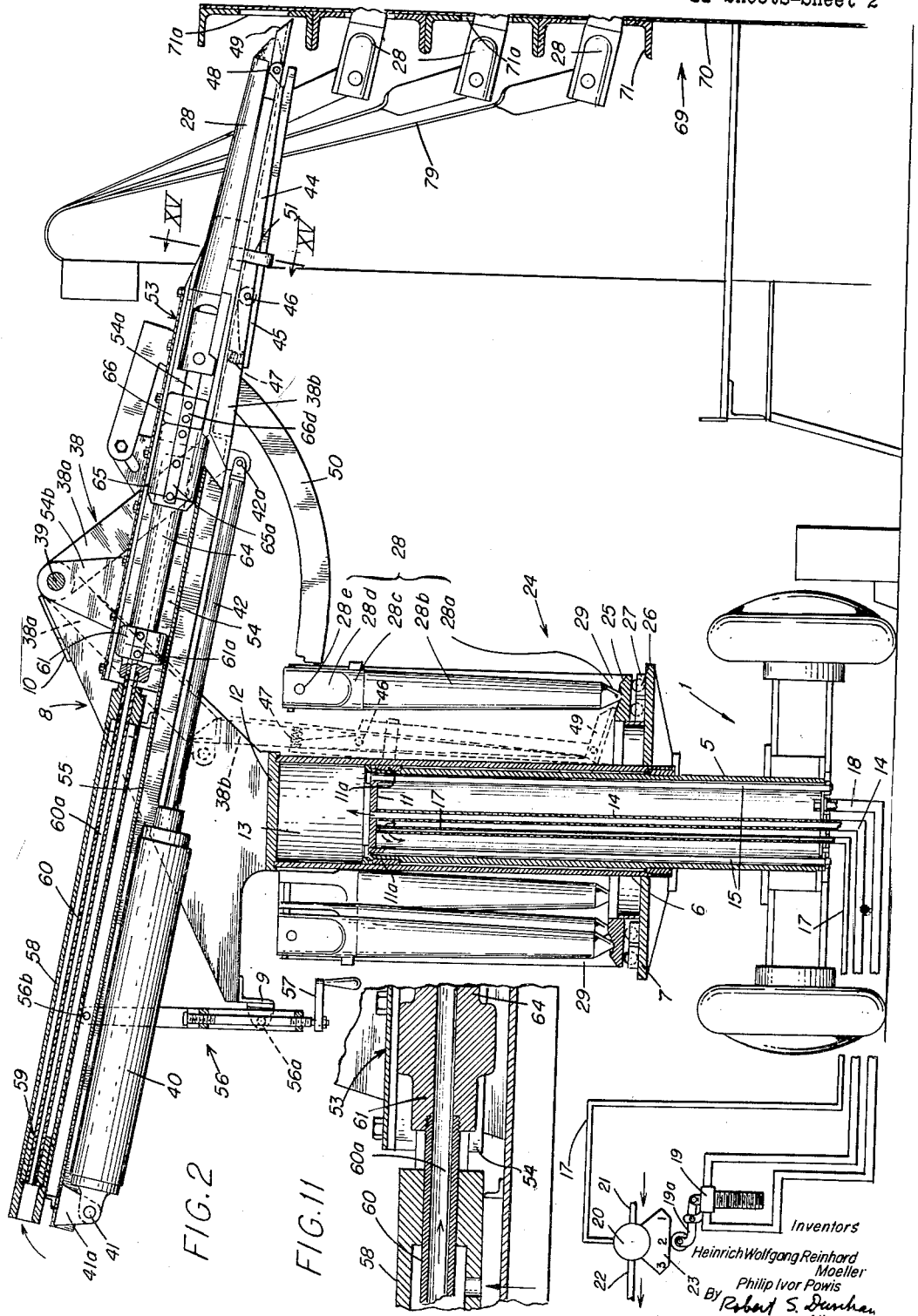

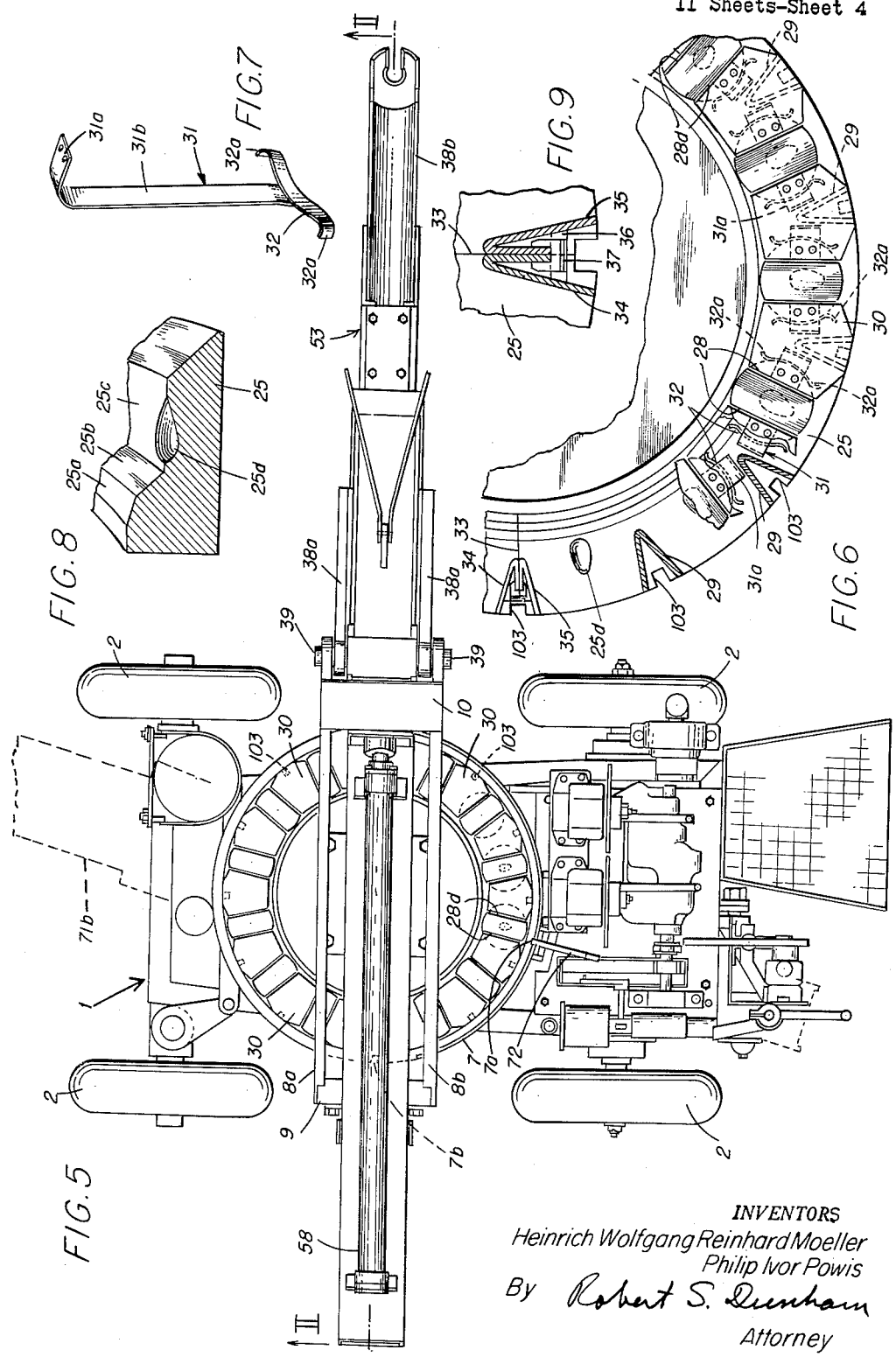

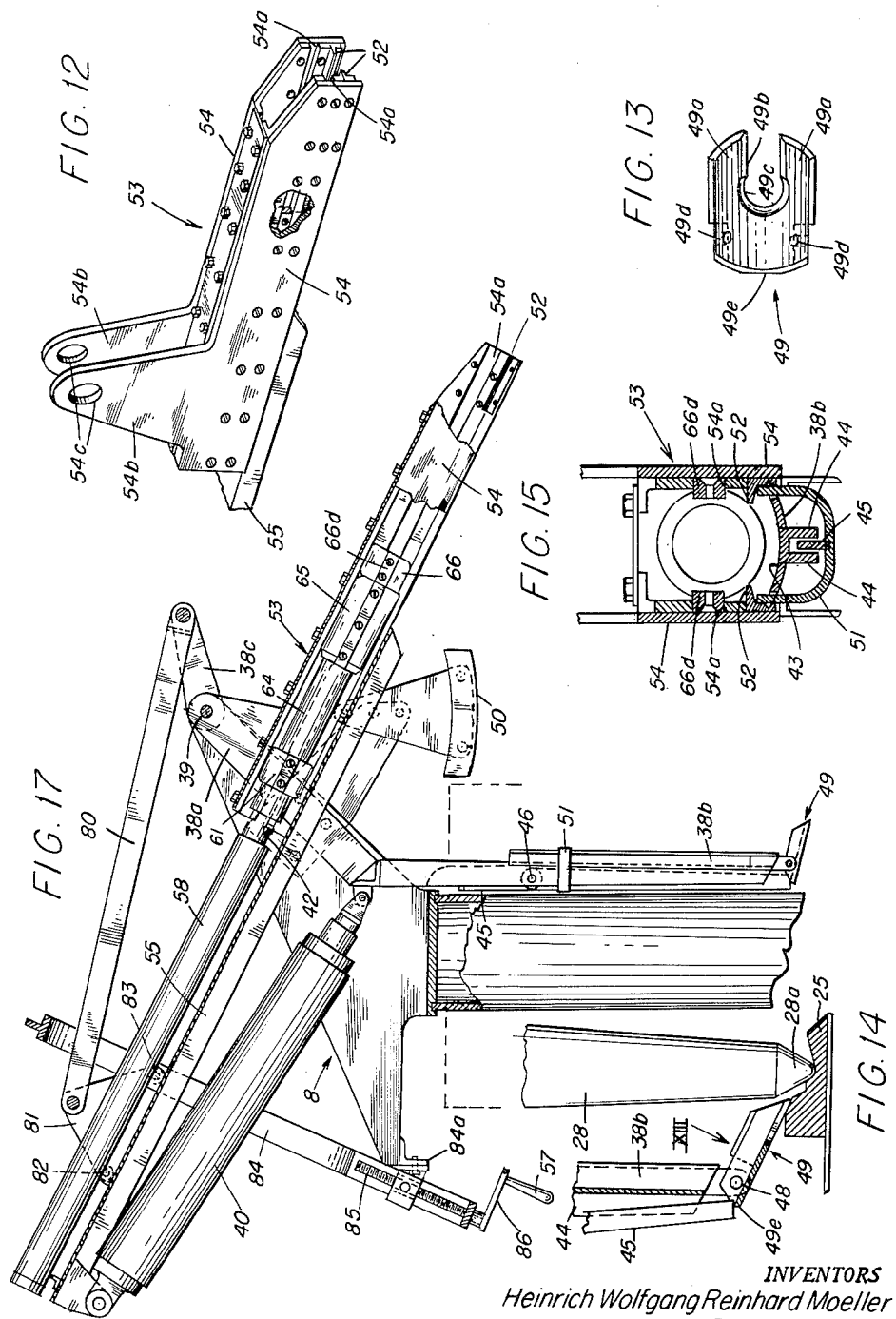

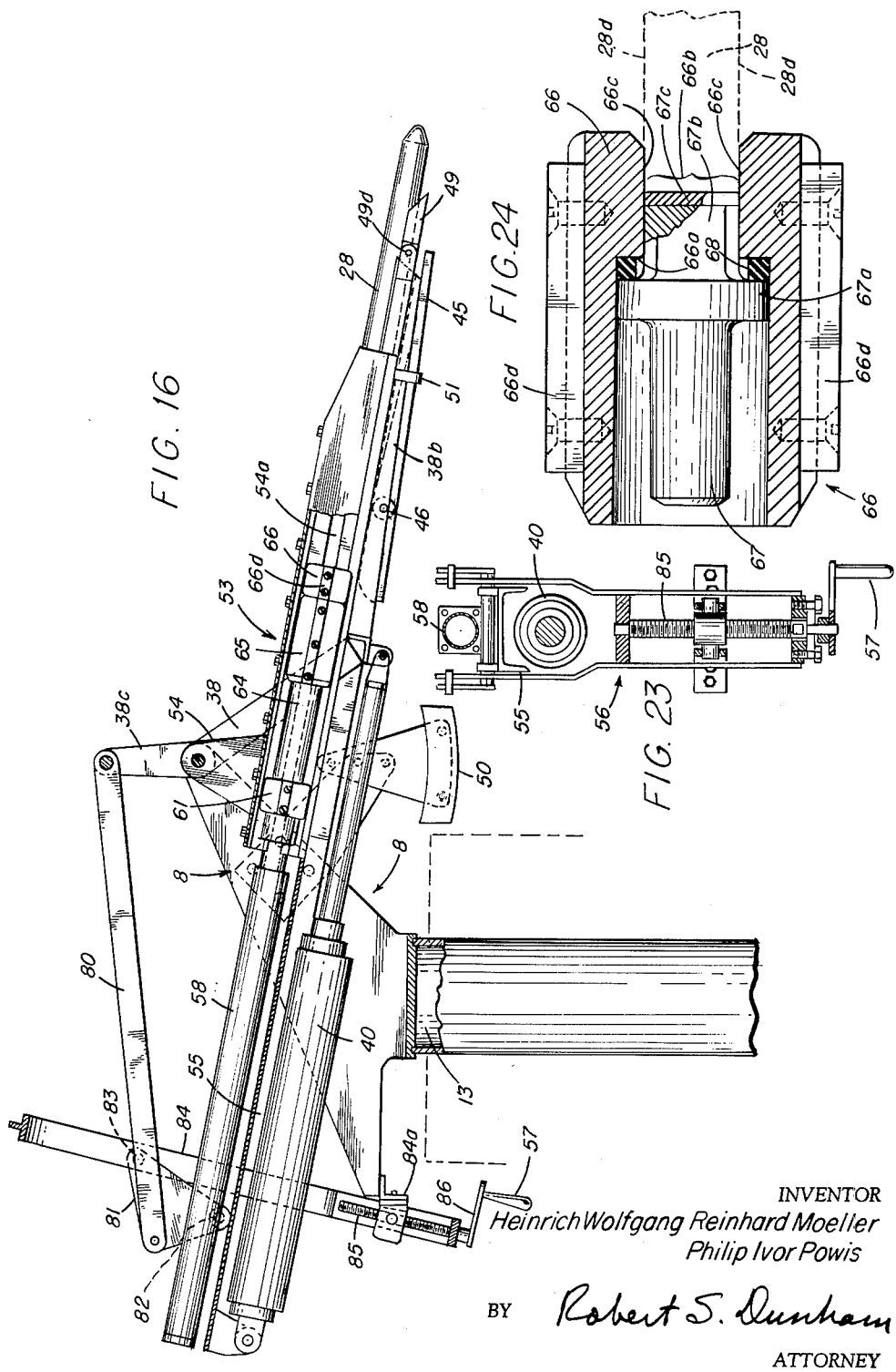

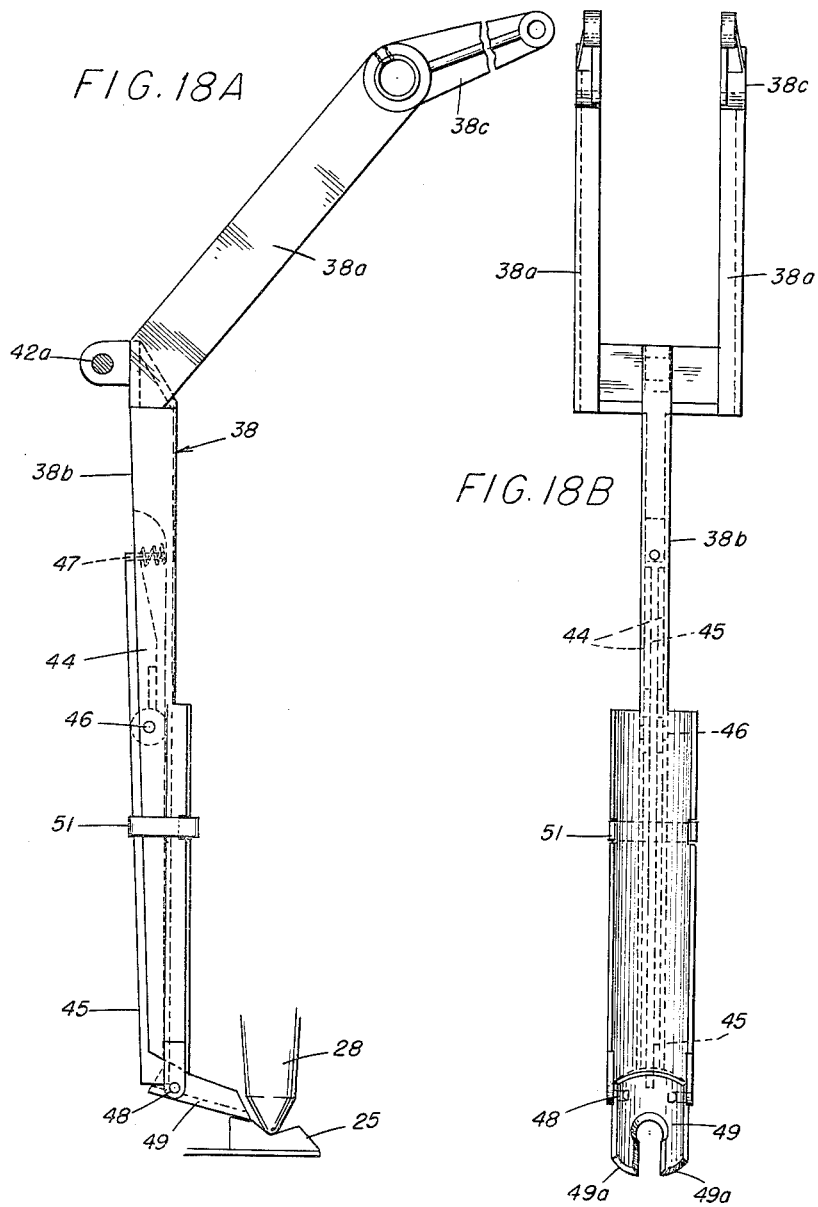

INVENTOR
Heinrich Wolfgang Reinhard Moeller
Philip Ivor Powis

BY Robert S. Dunham
ATTORNEY

INVENTOR
Heinrich Wolfgang Reinhard Moeller
Philip Ivor Powis
ATTORNEY

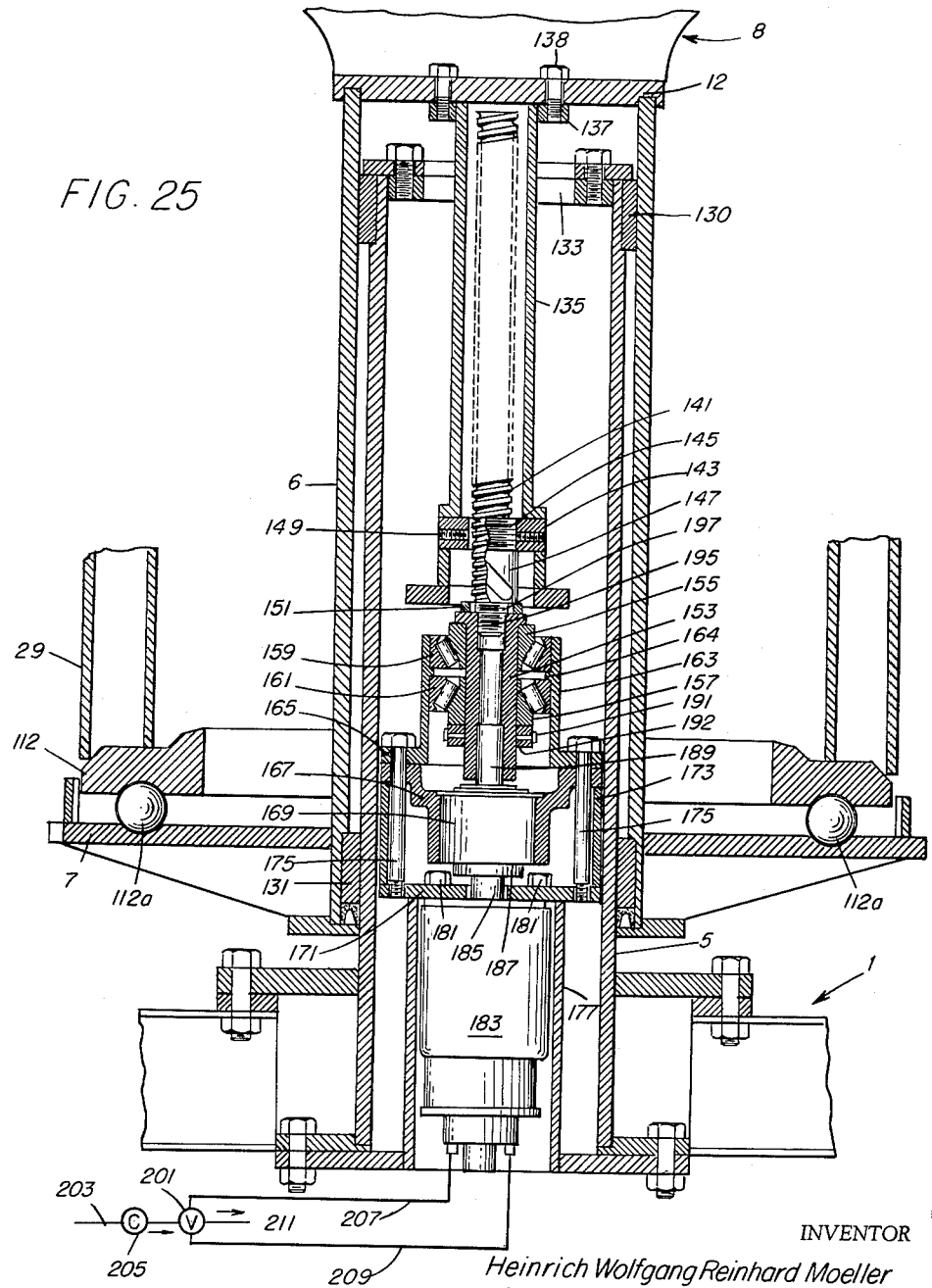

United States Patent Office 3,027,559
Patented Apr. 3, 1962

3,027,559
STUD PLANTING APPARATUS
Heinrich Wolfgang Reinhard Moeller and Philip Ivor Powis, Arvida, Quebec, Canada, assignors to Aluminium Laboratories Limited, Montreal, Quebec, Canada, a corporation of Canada
Filed Oct. 26, 1959, Ser. No. 848,677
28 Claims.  (Cl. 1—1)

This invention relates to apparatus for guiding and driving elongated elements such as studs, pins, nails or the like and particularly to apparatus for planting such studs in self-baking electrodes, also known as Soderberg electrodes.

In the electrolytic refining of aluminum, it is necessary to supply large currents of electricity to a pot in which a molten mixture of aluminum salts is continuously being treated. The electrodes which supply electricity to these pots usually are formed of materials which are gradually consumed because of the high temperature existing in the pot. It has become conventional in such pots to use a type of continuously consumed electrode, known as a self-baking electrode or Soderberg electrode. Such electrodes are described, for example, in Soderberg Patent No. 1,440,274.

The modern form of Soderberg electrode is made by supplying a mixture of suitable materials, usually containing a carbonaceous material such as coke, in the form of a paste at the top of a vertically elongated electrode housing. This paste mixture is retained at its sides by a metallic sheath which is usually rather thin and formed of material which will not contaminate the melt. For example, where the electrode is being used to refine aluminum ore, the sheath is commonly a thin sheet of aluminum. Outside the aluminum sheath is the electrode housing proper, commonly built of steel bars set horizontally side by side, one above the other, and supported by a suitable supporting structure. As the electrode becomes consumed at its lower end, it is continuously fed downward by moving the housing downward and additional materials are supplied at the top. The paste mixture in the electrode gradually bakes due to the high operating temperature of the electrode, so that the lower operating end of the electrode which is immersed in the electrolyte is substantially pure carbon. As the electrode is fed downwardly, the steel bars of the housing are removed at a point somewhat above the electrolytic crust, and additional steel bars are added near the top of the electrode. New sheets of sheath material are provided inside the newly mounted steel bars.

Electric current is supplied to the electrode through a plurality of studs, which are elongated members of electrically conductive heat-resistant material, usually a steel alloy. Rows of these studs, one row above the other, are driven into the outside of the electrode as it moves downwardly. The steel supporting bars are apertured to permit entrance of the studs, which are driven through the thin sheath and into the electrode at a point where its interior is still in a pasty condition. The studs are removed, like the steel bars, as they approach the region of the electrolytic current, so that they will not contaminate the melt.

Commonly there are several rows of studs in the electrode at any time. The lower one or two rows ordinarily are used for current supply purposes, the rows above the lower rows being in uncured or only partially cured parts of the electrode which are not yet ready to carry the electric current.

The operation of driving these studs into an electrode has commonly been performed by hand. The space available around the pots usually is restricted and makes difficult the manipulation of tools for such manual driving operation, the magnetic field in this space caused by the heavy currents flowing in the electrode increasing this difficulty. Furthermore, the studs must be planted in the electrode without disturbing the lower rows of studs and the connections thereto which are carrying current. While the voltage concerned is not high, the heavy currents require that the operation of driving the studs be carried out without risk of engaging or breaking the conductors or connections.

The development of mechanical apparatus for driving the studs also has been prevented by the difficulty of providing apparatus which would supply a sufficient impact to drive the stud through the metal sheath, but which would thereafter apply only sufficient force to drive the stud along through the soft interior of the uncured electrode to the desired depth.

An object of the present invention is to provide apparatus for mechanically driving current carrying studs into a self-baking electrode.

Another object is to provide such an apparatus which may be mounted on a truck carrying a magazine of studs, and including a mechanism for transferring the studs from the magazine to the stud driving mechanism.

A further object of the invention is to provide apparatus of the type described, including lift means for changing the elevation of the stud driving mechanism to allow for driving the studs at various elevations and at the proper angle with respect to the electrode.

A still further object is to provide apparatus of the type described which is so constructed that it conveniently may be operated adjacent the pots and is not adversely affected by the intense magnetic fields encountered near a furnace electrode.

A further object of the invention is to provide apparatus of the type described including pneumatic motors for performing operations requiring power.

An additional object is to provide apparatus of the type described, including novel interlocks between the various parts to ensure that they are operated in a predetermined sequence.

Another object is to provide an improved power operated lift mechanism in which the power may be supplied from a suitable source, pneumatic, hydraulic, mechanical or other, and which may be locked at any point to which it is lifted.

Another object is to provide improved apparatus of the type described, including a motor, which may be pneumatic, for advancing the stud with a steady force, a riveting hammer for applying impact blows to the stud, and automatic means for bringing the riveting hammer into play whenever the advancing movement effected by the motor is slowed below a predetermined rate.

The foregoing and other objects of the invention are attained in the apparatus described herein, which is mounted on a truck so as to be movable around the periphery of a large electrode. In one aspect of the invention the truck carries a lift comprising an inner vertical cylinder closed at its lower end and an outer vertical cylinder concentric with the inner cylinder and vertically slidable and rotatable on the inner cylinder. The stud driving mechanism is supported on the outer cylinder at the upper end thereof. Both cylinders are closed at their upper ends, the upper end of the inner cylinder being slidably in pressure tight relation to the outer cylinder, and the space between those closed ends is filled with liquid. The inner cylinder is partially filled with liquid, and a liquid communication line connects between the bottom portion of the inner cylinder and the space between the two cylinders. This line is controlled by a valve. When the valve is closed, the upper cylinder is hydraulically locked in position by virtue of the filling of the space between the two cylinders with liquid. The vertical movement of the outer cylinder is produced and controlled by supplying compressed air concomitantly with movement of the liquid from the inner cylinder to the space between the cylinders, or exhausting the air from the inner cylinder above the level of the liquid therein concomitantly with reverse movement of the liquid between the cylinders. A valve controlling the supply of air to and the exhaust from the inner cylinder is coordinated with the hydraulic locking valve referred to so that the vertical position of the outer cylinder is always locked when no air is being supplied to or removed from the inner cylinder.

In another aspect of the invention the lifting mechanism comprises a vertical threaded spindle supported by a thrust bearing and rotated by a suitable motor, which may be pneumatic or of other type, a nut on this threaded spindle being moved upwardly and downwardly therealong upon bi-directional rotation thereof. The nut is connected to the support for the stud driving mechanism by members which may include a cylindrical member corresponding to the outer cylinder of the pneumatic-hydraulic mechanism above referred to. A bi-directional locking type clutch is combined with the spindle in this lifting mechanism to hold the spindle locked against rotation, thereby to hold the stud driving mechanism in any position thereof to which it has been moved.

Mounted exteriorly on the outer cylinder in either aspect is a supporting structure, which for simplicity may be called a frame, comprising a member in the form of an annular bracket extending circumferentially about and outwardly from the outer cylinder adjacent the lower end of the cylinder, and a beam extending generally radially with respect to the axis of and outwardly from the upper end of the cylinder. A magazine for carrying studs comprises a ring encircling and concentric with the cylinder and rotatably supported on the annular bracket, and a plurality of vertical stud supports fixed on the ring in spaced relation about the axis. The stud supports of consecutive pairs of adjacent supports define between them a stud receiving space.

A stud planting arm is pivotally mounted on the outer end of the beam. Stud driving means are mounted on the planting arm. A stud transfer arm is pivotally mounted on the beam and is movable between a retracted position inside the magazine, through a stud pick-up position, where it passes between the two stud supports of a pair of the stud supports, to a planting position where a stud carried by the transfer arm is aligned with the stud driving means on the stud planting ram. In the return movement of the transfer arm it again passes between the same stud supports from between which it previously removed the stud, before the magazine is rotated to bring a new stud to the pick-up position.

The stud driving means on the planting arm comprises a motor, preferably a pneumatic cylinder having a piston connected by a piston rod to a riveting hammer. The compressed air for actuating the riveting hammer passes through a conduit formed inside the piston rod and extending from the interior space of the pneumatic cylinder at the end thereof at which the air is supplied to this cylinder, the other end of the conduit being connected to the riveting hammer to move therewith in alignment with the stud concomitantly with delivery of air to the hammer.

Pneumatic motors are provided for rotatively advancing the magazine, for moving the stud transfer arm forwardly and reversely between its retracted and its stud planting positions, and for operating the stud driving mechanism. Another pneumatic motor is provided to give traction for the truck. The several pneumatic motors other than the traction motor are interlocked to prevent an improper sequence of actuation of the motors.

Other objects and advantages of the invention will become apparent from a consideration of the following specification and claims, taken together with the accompanying drawings.

FIG. 1 is an elevational view of one form of stud planting apparatus embodying the invention;

FIG. 2 is a vertical cross-sectional view of the apparatus of FIG. 1 taken on line II—II, FIG. 5.

FIG. 3 is a fragmentary elevational view similar to FIG. 1, but on an enlarged scale;

FIG. 4 is a fragmentary view taken on line IV—IV of FIG. 3;

FIG. 5 is a plan view of the apparatus of FIG. 1;

FIG. 6 is a fragmentary plan view, partly in section, showing to enlarged scale a portion of FIG. 5;

FIG. 7 is a perspective view of a stud retaining spring used in the magazine;

FIG. 8 is a fragmentary perspective view, partly in section, showing the structure of the bottom ring of the magazine;

FIG. 9 is a cross-sectional view, taken on line IX—IX of FIG. 3, on an enlarged scale;

FIG. 11 is a fragmentary view to enlarged scale showing a detail of the stud planting cylinder and the connection of the conduit therein to the riveting hammer;

FIG. 12 is a perspective view, partly broken away, showing the slide support for the riveting hammer and the stud planting mechanism;

FIG. 13 is a plan view, in the direction of the arrow XIII in FIG. 14, showing the stud lifting fork;

FIG. 14 is a fragmentary view, partly in vertical section and partly in elevation, illustrating the operation of the stud transfer arm;

FIG. 15 is a cross-sectional view taken on the line XV—XV of FIG. 2;

FIG. 16 is a view, partly in elevation and partly in vertical section of a modification of the stud planting mechanism showing the parts in stud planting position;

FIG. 17 is a view similar to FIG. 16 showing the parts in retracted position preparatory to picking up a stud;

FIG. 18A is a side elevational view of the stud transfer arm to enlarged scale;

FIG. 18B is a view of the transfer arm from the right in FIG. 18A;

FIG. 23 is an elevational view of the planting arm adjusting mechanism;

FIG. 24 is a longitudinal section of the hammer guide and anvil; and

FIG. 25 is a vertical cross-sectional view of a modified form of the lifting apparatus of the invention.

Figure 10:
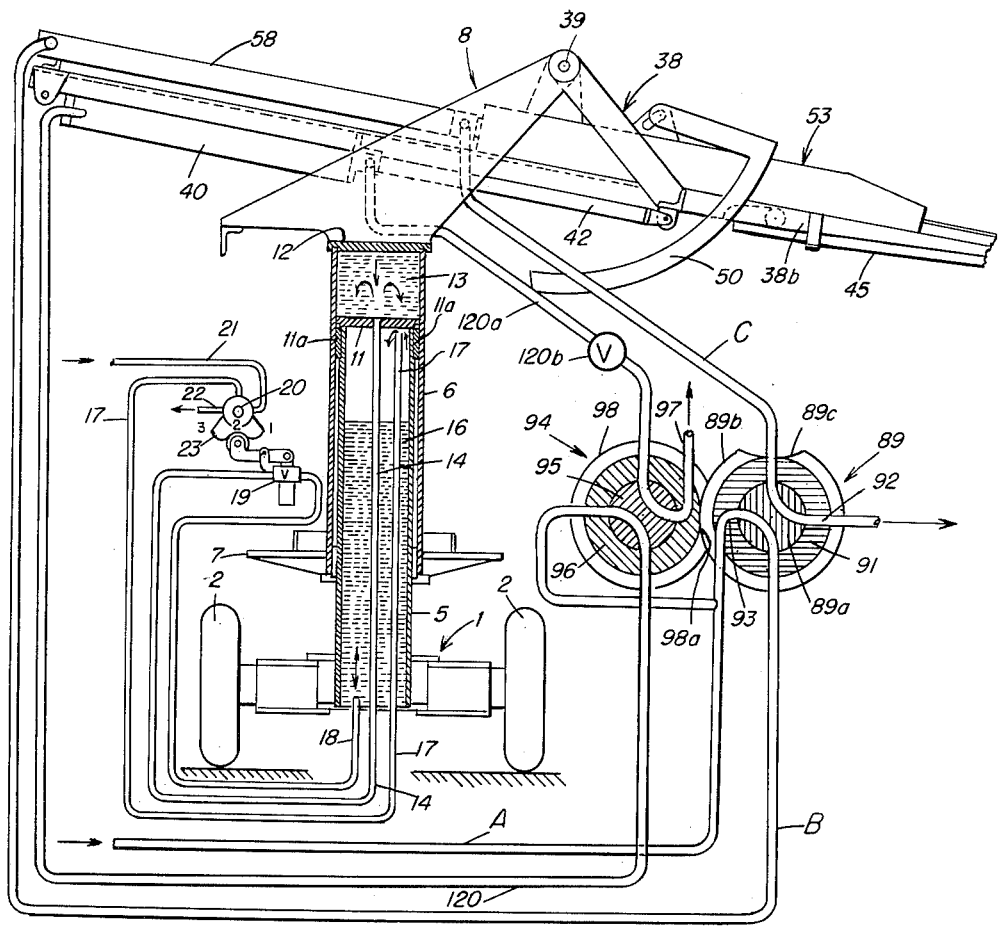
FIG. 10 is a somewhat diagrammatic view illustrating the flow paths in the pneumatic and hydraulic lines connecting the various pneumatic motors.

A simplified embodiment of the apparatus is illustrated in FIGS. 1 to 15. An improved form of one part of the apparatus is illustrated in FIGS. 16 to 18, comprising an automatic depressing linkage. FIGS. 19 to 22 illustrate a further modification including an automatic magazine advance mechanism.

FIG. 25 shows the preferred form of the lifting apparatus of the invention. In order, however, to bring out the relation of the apparatus of FIG. 25 to the essential elements of the stud planter apparatus shown and described in connection with FIGS. 1 to 22, inclusive, the description of the lifting apparatus of FIG. 25 is deferred until after completing the description of the embodiment of FIGS. 1 to 15, the improved form of the depressing linkage and the magazine advance mechanism above mentioned.

The apparatus illustrated in the drawings includes the following principal parts:

(1) A truck mounted on pneumatic tires and supporting a chassis which remains at a fixed level with respect to the floor;

(2) A vertically movable frame mounted on the truck chassis;

(3) Motor mechanism for raising and lowering the vertically movable frame on the truck chassis;

(4) A magazine mounted on the vertically movable frame and carrying a supply of studs;

(5) A stud transfer mechanism for moving studs from the magazine to the planting mechanism, and also mounted on the vertically movable frame;

(6) A stud planting mechanism mounted on the vertically movable frame;

(7) Provision for rotation on vertical axis;

(8) Stud planter depressing mechanism;

(9) Interlocking controls for the magazine, the planting mechanism and the transfer mechanism;

(10) Automatic magazine advancing mechanism.

These various elements will be described in detail below, in the order set forth. In most of the drawings, the pneumatic hydraulic supply lines have been omitted in order to avoid confusing the drawing. The supply lines and controls, however, have been shown in diagrammatic figures, to illustrate the functions of movement and of the various interlocks. It will be understood that suitable air and hydraulic means may be provided.

(1) *Truck and Fixed Level Frame*

A truck, generally indicated at 1, is provided with four wheels 2, by means of which it may be rolled or driven along an underlying support or floor 3. The truck 1 is preferably provided with a pneumatic motor 4 for motive power, and also preferably is provided with suitable steering mechanism. A vertical cylinder 5, FIGS. 1 and 2, is fixed on and extends upwardly from the center of the chassis of the truck 1. The cylinder 5 hereinafter is referred to as the fixed cylinder.

(2) *Vertically Movable Frame*

A second cylinder 6, hereinafter referred to as the movable cylinder, is slidably and rotatably mounted on the cylinder 5 (see FIG. 2). An annular member for distinction called a bracket 7 is disposed in a plane transverse to the axis of the cylinder 6 adjacent the lower end thereof and extends outwardly from and about the entire periphery of that cylinder. Fixed on the top of the cylinder 6 is a beam or truss generally indicated by the reference numeral 8 and consisting of a pair of plates 8a, 8b, FIG. 5 connected at their ends by braces 9 and 10.

(3) *Vertical Driving Motor Mechanism FIGS. 2 and 10*

The top of the fixed cylinder 5 is closed by a plate 11, and the top of the movable cylinder 6 is closed by a plate 12. Packing means 11a cooperates with the plate 11 and the inner surface of the cylinder 6 to provide pressure tight space between the plates 11 and 12, inside the cylinder 6, which is completely filled with a hydraulic liquid, as shown at 13 in FIG. 10. This space at times is supplied with hydraulic liquid and liquid at other times is exhausted from the space 13 through a conduit 14 which extends downwardly through the cylinder 5. The cylinder 5, its top plate 11 and related parts are held assembled on and in pressure tight relation to a plate carried by the chassis of truck 1 by four through bolts 15. The space inside the cylinder 5 is partly filled with hydraulic liquid, as shown at 16 in FIG. 10, the upper part of the space inside the cylinder 5 being filled with air above the liquid. Air is supplied to or exhausted from the top part of the cylinder 5 through a conduit 17 which extends downwardly through that cylinder. The hydraulic liquid is supplied to or exhausted from the bottom of the cylinder 5 through a conduit 18, FIGS. 2 and 10, which is connected through valve 19 and the conduit 14 to the space 13.

The cylinder 5 serves as a tank or reservoir of liquid, which may flow from the cylinder 5 out through conduit 18, through valve 19 and thence through conduit 14 to the space 13. On the other hand, liquid may flow from the space 13 through conduit 14, valve 19 and conduit 18 to the cylinder 5. When the valve 19 is closed, liquid cannot flow to or from the space 13. Since the liquid is substantially incompressible, the volume of the space 13 is fixed and the cylinder 6 and the parts mounted thereon are locked against vertical movement.

When the valve 19 is opened, the cylinder 6 may be raised or lowered by supplying air to or exhausting it from the top of the cylinder 5 through the conduit 17. The flow of air through conduit 17 is controlled by a three-position valve generally indicated at 20, FIGS. 2 and 10, which may connect the conduit 17 either to a compressed air supply line 21 or to an exhaust line 22. Valve 20 carries a cam 23 operating a follower connected to the valve 19. The valve 20 is closed in its intermediate position, as shown, and the valve 19 also is closed and the vertical position of the cylinder 6 is fixed. When the valve 20 is in one end position, compressed air is supplied from the line 21 to the conduit 17. When the valve 20 is in its other end position, air is exhausted from the conduit 17 to the exhaust line 22. In either of the end positions of the valve 20, the cam 23 is effective to open the valve 19 by actuating the lever 19a through the cam follower.

There thus is provided a lift mechanism for the vertically movable frame which derives its power from the same source of compressed air as the other motor mechanisms, but which is capable of locking the driven load, i.e., the vertically movable frame, in any fixed position to which it may be lifted.

(4) *Magazine—FIGS. 1, 2, 3 and 5 to 9*

The magazine is generally indicated by the reference numeral 24, and includes a supporting ring 25 which, in the form shown in FIGS. 2 and 4, rests upon a plurality of rotatable balls 26 mounted in bearing blocks 27 supported on the bracket 7.

A plurality of stud supports 29 extend upwardly from the ring 25. The stud supports are spaced apart so as to define a stud receiving space between the two adjacent stud supports which form a pair of supports of a plurality of consecutive pairs about the axis of the cylinders. In each stud receiving space a stud 28 may be mounted.

The studs 28 may be made from any metal having sufficiently high strength and sufficiently high electrical conductivity. In a given installation, the strength requirements may be paramount, in which case steel may be used. On the other hand, if the electrical conductivity requirements are the most important, then copper may be used. Each stud has a generally conical tip 28a, appearing at its lower end, as viewed, for example, in FIG. 2, a shank 28b extending upwardly from the tip 28a and tapering so that it gradually increases in diameter toward its upper end, a short cylindrical portion 28c just above the shank having flat parallel faces 28d formed at each side at its upper end, and preferably bored as at 28e for the attachment of a suitable electrical connector.

The stud supports 29 are preferably made of steel plates bent in a V-shaped cross-section, FIG. 6. The supports 29 are welded at their lower ends to the ring 25. At its upper end, each support 29 carries a plate 30 (FIGS. 3, 5 and 6) which extends horizontally into the adjacent stud receiving spaces with its edges adjacent the flat faces 28d of the studs received therein, as best seen in FIG. 6. On its under side, each of the plates 30 carries two guide springs 31, one of which is shown in detail in FIG. 7. The guide spring includes a horizontal leaf spring portion 31a which is fastened, as by bolts to the plate 30, and a downwardly extending portion 31b integral with the portion 31a. At the lower end of the portion 31b, a horizontal crossbar spring 32 is formed integrally or is attached as by welding. The central portion of this crossbar spring corresponds in contour to the periphery of the cylindrical portion of the studs 30. The ends of the crossbar 32 are bent back in wings 32a to permit easy movement of the studs 28 into and out of the stud receiving spaces, the resilience of the guide springs in such movement providing for lateral displacement of the wings 32 engaged by the cylindrical portion, the crossbars 32 and the wings 32a engaging this cylindrical portion when the stud is in place in the magazine to hold the stud in position.

The structure of the ring 25 is shown in detail in FIG. 8. The ring 25 has an inner upwardly projecting flange 25a having an outwardly facing slanting surface 25b. Just outside the slanting surface 25b is a horizontal surface 25c having a plurality of recesses 25d formed in it to receive the tips 28a of the studs 28.

The ring 25 and the supporting elements 29 mounted thereon are constructed in two semicircular sections. Two sections are joined at 33 in FIGS. 6 and 9. At this joining, in place of each of two diametrically opposite supports 29 above described, there is provided a split support having two half supports 34, 35 abutted at joint 33. These half supports 34 and 35 are provided with abutting flanges extending radially of the ring 25 and carry also brackets 36 upon which clips 37 may rest as they are forced into position embracing the abutting flanges. After the two halves of the ring 25 are assembled, they are fastened together by means of the clips 37, as in FIG. 9. The magazine is rotatable on its vertical axis, the axis of ring 25, in rolling engagement with the balls 26. In this embodiment such rotation of the magazine may be effected manually and handles (not shown to avoid confusion) may be attached to the supports 29 or other suitable members of the magazine structure for effecting such rotation.

(5) Stud Transfer Mechanism—FIGS. 1 and 2

The stud transfer mechanism is adapted to move the studs one by one from the magazine 24 and lift them to a position aligned with a stud planting mechanism, which is pivotally supported on the beam 8 at the top of the apparatus.

As shown in FIGS. 1, 2 and 5, the stud transfer mechanism comprises a transfer arm 38. The transfer arm comprises two parallel upper portions 38a which are pivotally movable at the upper ends on pivot pins 39 secured respectively in the plates 8a and 8b of the beam 8. The upper arm portions 38a are rigidly connected at their lower ends to an outer arm portion 38b, FIGS. 1, 2 and 18, which extends at an angle to the upper arm portions.

The arm 38 swings radially between the full line or planting position shown in FIG. 2, wherein the lower arm portion 38b is aligned with the stud planting mechanism, and a retracted position shown in dotted lines in FIG. 2, wherein the lower arm portion 38b is disposed inside the stud supports 29 of the magazine 24.

The arm 38 is moved between its stud planting position and its retracted position by an expansible link comprising a cylinder 40 pivoted at its left-hand end on the pivot pin 41 supported by brackets 41a mounted on the rearward extension 55 of the structure which carries the stud planting mechanism. A piston (not shown) moves inside the cylinder 40 and is connected to a positive piston rod 42 pivotally connected at 42a to the stud transfer arm 38. When the piston has travelled to the right-hand end of the cylinder 40, the arm 38 is swung upwardly to its stud planting position. When the piston is moved to the left-hand end of the cylinder 40, the arm 38 is moved to its retracted position.

The web portion of the lower arm 38b which engages the stud 28 is made concave or of channel section on its stud engaging side, as shown at 43 in FIG. 15. The under side of the arm 38b, as viewed in FIG. 15, is provided with depending flanges 44 defining therebetween a channel. A latch lever 45 is pivotally mounted on pin 46 supported in the flanges 44 at the under side of the transfer arm 38b for movement between the flanges 44. A spring 47 is retained between the web 43 of arm 38b and the rear end of the latch lever 45, as best seen in FIG. 2, and biases the lever 45 to a latching position, shown in dotted lines in FIG. 2 and shown also in FIGS. 14 and 18A. Pivotally mounted at 48 on the end of the arm 38b is a fork 49, shown in detail in FIG. 13. Referring to FIG. 13, there are shown two tines or fingers 49a defining between them a slot 49b which terminates in a circular recess 49c. Adjacent its rear end the fork 49 is provided with lugs having apertures 49d to receive the pivot pin 48. On the opposite side of the pivot pin 48 from the fingers 49a, the fork 49 is provided with a heel portion 49e which is adapted to engage the end of the latch lever 45.

When the stud transfer arm 38 is in its retracted position, FIGS. 2, 14 and 17, the lever 45 is biased to its latching position by the spring 47, in which position it engages the heel portion 49e of the fork 49 to prevent clockwise rotation of the fork from the position shown in FIG. 14. The fork 49 reaches this position as the arm 38b moves to the retracted position, the toe of the fork being brought into engagement with the ring 25 and while sliding thereover being pivotally moved counterclockwise on pin 48 to the position shown in FIG. 14.

Prior to movement of the stud transfer arm 38 from its retracted position within the circle of the stud supports 29 of the magazine to its stud planting position, the magazine is rotated to bring one of the studs in a given receiving space between supports 29 into register with the stud transfer arm. Thereafter, the cylinder 40 may be operated to swing the stud transfer arm from its retracted position through the given space between stud supports to its stud planting position. As the stud transfer arm moves away from its retracted position, the fingers 49a straddle the tip 28a of the stud 28, and the tip becomes disposed in the circular recess 49c of the fork 49. The concave surface 43 of the stud transfer arm then engages the side of the stud and pushes the stud out from between the springs 31. The position of the stud transfer arm 38 at which it engages the stud and starts to move it from the magazine to the planting position is hereinafter referred to as the stud pick-up position of the transfer arm.

As the transfer arm 38 moves beyond the pick-up position, the upper flattened end portion of the stud 28 carried thereon passes between a pair of arcuate guides 50, which in FIGS. 1 and 2 are supported on the extension 53 of the stud planting mechanism and which engage the flat surfaces 28d and hold the stud against rotation on its axis. In the embodiments of FIGS. 16 and 17 the guides 50 are supported by brackets secured upon the beam 8.

Fixed on the latch lever 45 at a point forward of the pivot pin 46 is a U-shaped trigger 51, FIGS. 2, 15 and 17. As the stud transfer arm moves upwardly into the stud planting position shown in full lines in FIG. 2, the ends of the trigger 51 are engaged by fingers 52 (see FIGS. 12 and 15) carried on the forward extension 53 of the stud planting mechanism. Since the lever 45 angularly moves with the stud transfer arm on the pins 39, as the transfer arm completes its final movement to the stud planting position, the engagement of the trigger 51 with the fingers 52 causes the latching lever 45 to rotate clockwise in FIG. 2 with respect to the lower part 38b of the transfer arm, the spring 47 being compressed, and the tip end of lever 45 is moved out of the path of rotational movement of the heel 49e of the fork 49. The fork 49 thereby falls by gravity to the position shown in full lines in FIG. 2, wherein it is aligned with and forms an extension of the transfer arm 38b and does not impede the movement of the stud 28 in the planting direction. The channel between flanges 44 on the under side of the transfer arm 38b serves as a guide for the latching lever 45 in its movements. The flanges 44 also reinforce the part 38b of the transfer arm.

(6) *Stud Planting Mechanism*—FIGS. 1, 2, 11 and 12

This mechanism is mounted on the stud planting arm and comprises the forward extension 53, FIGS. 2 and 12, formed of a pair of side plates 54 having keyways 54a on their inner side on which the riveting hammer structure may move slidably in engagement with the stud to be driven. The side plates 54 are provided with upward extensions 54b apertured at their upper ends, as shown at 54c, to receive the pivot pin 39, on which the stud planting mechanism is pivotally suspended. The stud planting arm has a rearward extension 55, the left-hand end of which as viewed in FIG. 2, carries brackets 41a which support the pivot pin 41 for the cylinder 40. The angular position of the stud planting arm is determined by an adjusting mechanism generally indicated at 56 and shown also in FIG. 23. This mechanism is supported on brace 9 for pivotal movement on pin 56a and is pivotally connected at 56b to the extension 55. The adjusting mechanism 56 is operated by a hand crank 57.

The rearward extension 55 of the stud planting arm supports a cylinder 58, FIG. 2, of conventional form, in which moves a piston 59. The piston 59 is fixed on a piston rod 60, which extends out through the right-hand end of the cylinder 58 and is threaded into a housing 61, FIG. 11, outside the cylinder. The piston rod 60 is hollow to provide a longitudinal air passage 60a from the interior of the cylinder 58 at the rear or entrance end thereof, FIG. 2, to the interior of the housing 61. The housing 61 forms the end of a hollow conduit member 64 which extends to and is connected to a riveting hammer generally indicated by the reference numeral 65. The details of the riveting hammer 65 are not shown, and any suitable riveting hammer mechanism may be used which may be mounted in the forward extension 53 for movement therealong. The housing 61 and the riveting hammer 65 are provided on their outer surfaces with keys 61a and 65a respectively, FIG. 2, which are adapted to slide in the keyways 54a of the forward extension 53 between an initial stud position and a stud planting position.

The hammer element of the riveting hammer 65 extends into a hammer guide 66, FIG. 24, carried by the hammer housing at the end thereof opposite to the housing 61, and there engages intermittently an anvil 67. The anvil 67 has a radially outwardly projecting flange 67a and the hammer guide 66 has a shouldered portion 66a at the right-hand end of the guide. An annular rubber cushion 68 is located within the guide 66 between the anvil flange 67a and the shoulder 66a and limits the outward movement of the anvil 67 toward the right in FIG. 2. The shouldered portion 66a defines a square opening 66b having rounded corners, which receives a similarly shaped extension 67b on the anvil 67. The outer end of the anvil extension 67b carries a stainless steel plate 67c, selected because of its non-magnetic qualities. The plate 67c is adapted to engage the rear end of the stud 28 which is being planted, this end of the stud being inserted in a vertical slot defined between surfaces 66c of the hammer guide, the flat faces 28d of this end of the stud loosely engaging the surfaces 66c.

For supporting the hammer guide 66 for movement together with the piston 59 and the hammer toward and away from the electrode, the hammer guide 66 is provided with keys 66d secured by screws threaded in the hammer guide 66. The keys 66d engage the keyways 54a of the forward extension 53 in sliding relation for the forward and rearward movement upon operation of the piston 59 as above described.

After the stud transfer arm has been moved to the full line position of FIG. 2, to bring the stud into alignment with the stud planting mechanism, compressed air is supplied to the left end of the cylinder 58, whereupon the piston 59 is moved forward, pushing the riveting hammer 65 to the right along the forward extension 53, and engaging the plate 67c with the back end of the stud 28 and sliding it forward along the stud transfer arm toward the electrode, which is generally indicated at 69. The electrode 69 is covered by a thin sheath 70. In the case of aluminum melting pots, the sheath 70 is formed of aluminum. The electrode 70 is supported and retained in place by housing members 71, which in the embodiment shown are channel shaped steel bars, located one above the other and apertured as at 71a to allow passage of the studs 28. The stud planting apparatus is brought into alignment with one of the apertures 71a before compressed air is supplied to the cylinder 58. This is accomplished by vertical movement of the cylinder 6 and the beam 8 supported thereon and by tilting movement of the stud planting structure on the pins 39 as hereinafter described.

The piston 59 pushes the entire assembly, including the riveting hammer 65 and the stud 28 to the right. Air under pressure also is supplied through the hollow piston rod 60 to the riveting hammer 65 which initiates and continues a rapid hammering of the stud so as to drive it through the sheath 70 and firmly into the electrode confined within the sheath.

(7) *Rotation of Apparatus About Vertical Axis*—
FIGS. 1, 2, 5, 19 and 21

The vertically movable frame and all the parts of the apparatus mounted thereon may be rotated about a vertical axis between an operating position shown in full lines FIG. 5, wherein the stud planting arm and related parts extend at an angle of 90° to the path of movement of the truck 1, and a travelling position generally indicated by the dotted line 71b in FIG. 5. The travelling position 71b is used when the truck is being driven from one electrolytic cell to the next.

Apparatus is provided for selectively latching the rotatably mounted annular bracket 7 in either the operating or travelling positions. This mechanism is best illustrated in FIGS. 1 and 5. An elongated lever 72 is pivoted on the truck 1 and is biased by a spring (not shown) to engage the periphery of the bracket 7. The bracket 7 is provided with two notches 7a and 7b. When the stud planting arm is in the operating position, the lever 72 engages the notch 7a as shown in FIG. 5. When the stud planting arm is in the travelling position, the lever 72 engages the notch 7b. The two positions are 75° apart in this embodiment.

Figure 19:
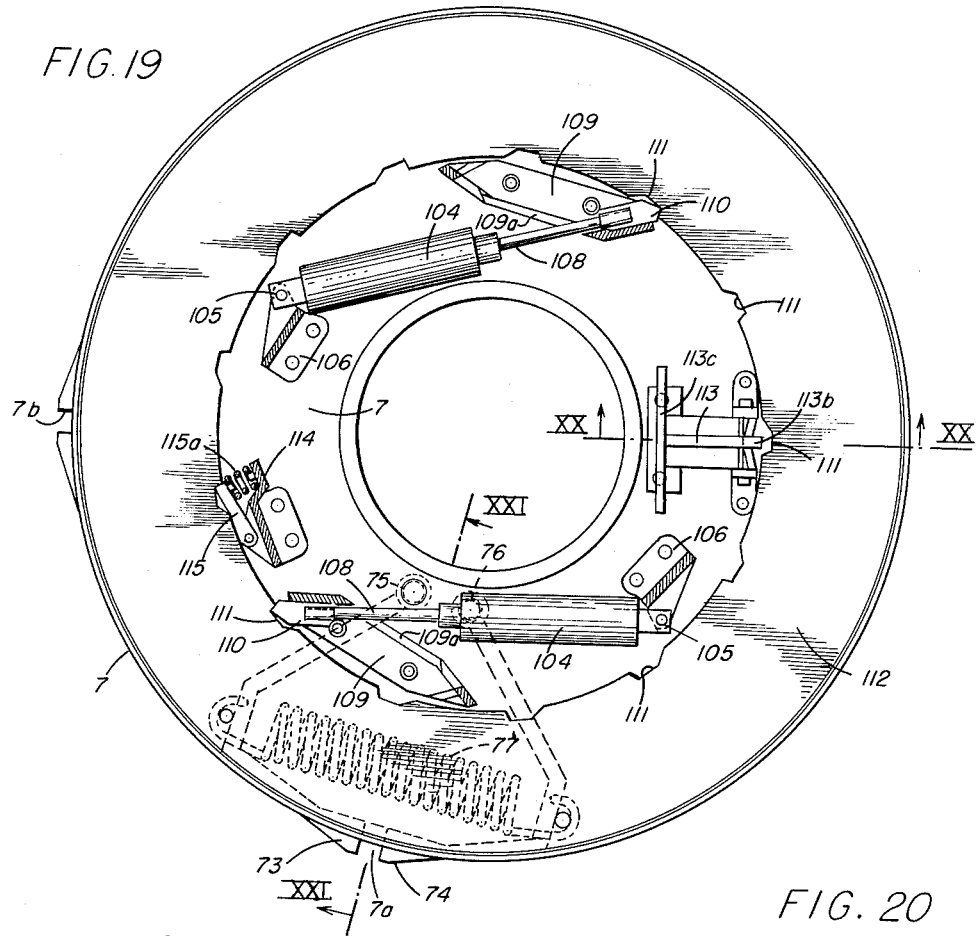
FIG. 19 is a plan view illustrating a modified form of magazine support provided with power means for effecting rotation thereof.
Figure 22:
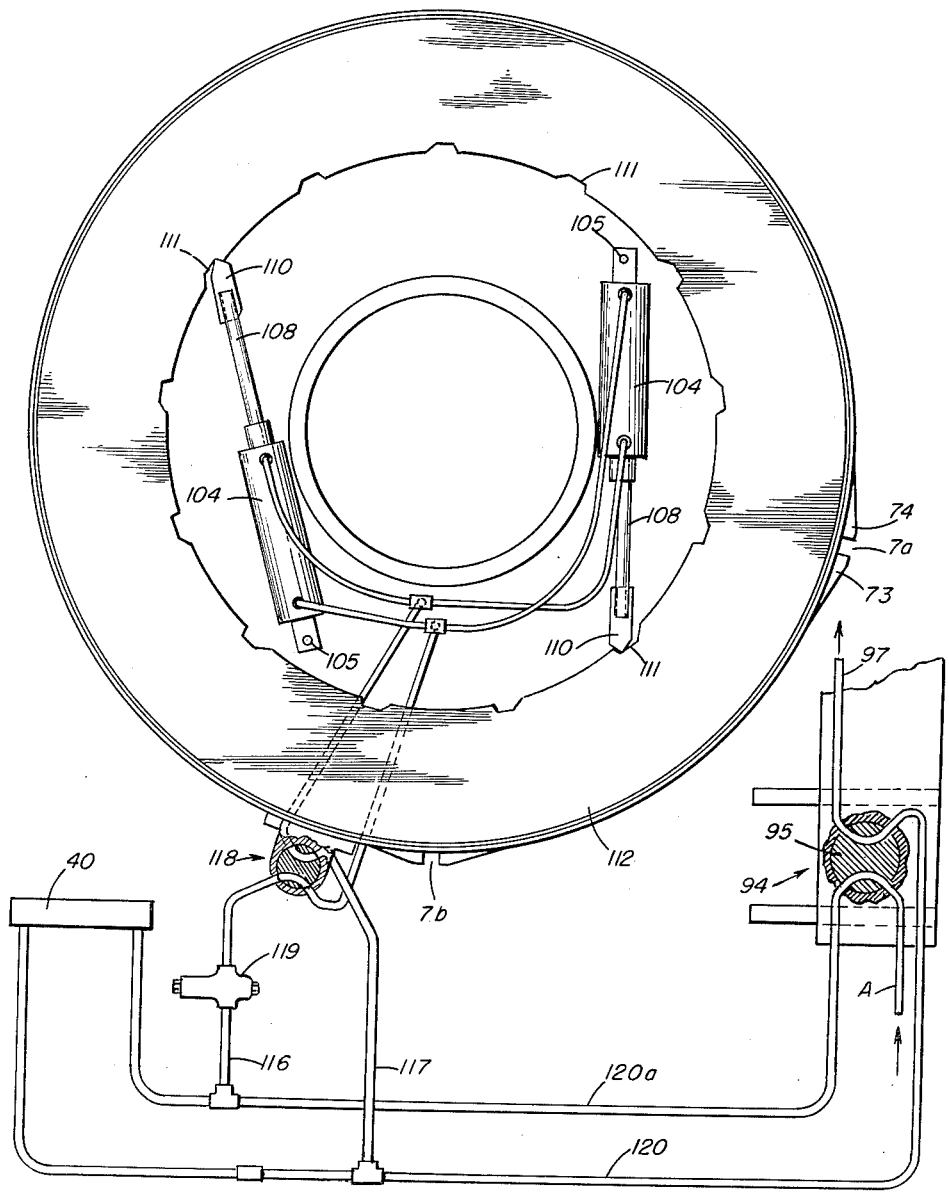
FIG. 22 is a somewhat diagrammatic view showing the magazine advancing motors of FIG. 21 and the pneumatic lines for supplying those motors.

In the modification shown in FIGS. 19 and 22, the notch 7a is replaced by a strain relief mechanism having two jaws 73 and 74 pivoted respectively at 75 and 76 on the under side of the bracket 7. A spring 77 biases the two jaws toward one another, this movement being limited by a downwardly projecting tooth 78 on the bracket 7 to maintain between the opposed ends of the two jaws a space corresponding to space 7a for receiving the latching lever 72 in the operating position. If, with the lever 72 between the two jaws 73, 74, the truck were operated and, for example the stud planting arm or any of the parts carried thereby were brought into engagement with the furnace or any of the furnace parts, such as one of the conductive flexibles 79, then the strain relief spring 77 would allow the bracket 7 and the parts supported thereon to rotate slightly with respect to the truck, thereby relieving any stress on the stud planting mechanism or on the furnace part which it may have accidentally engaged.

(8) Stud Planter Depressing Mechanism FIGS. 16 and 17

These figures show a modification of the invention including a linkage between the stud transfer arm 38 and the stud planting arm 55. In this modification the stud planting arm may be tilted downwardly to swing the end of the stud planting arm downwardly a distance such that it is clear of the flexible connectors or other furnace parts. The apparatus then may be moved conveniently along the periphery of an electrode without the necessity of raising or lowering the cylinder 6 to raise or lower the frame, or of swinging the stud planting arm to its travelling position between each stud planting operation.

The modification of FIGS. 16 and 17 includes an extension 38c rigidly secured to the stud transfer arm, which was not present on the stud transfer arm 38 of FIG. 1. The extension 38c projects upwardly from the pivot pin 39 and makes a sort of bell crank lever extension. The extension 38c, therefore, moves pivotally on the pin 39 with the other parts of the arm 38. The outer end of the extension 38c is pivotally connected to a link 80, whose opposite end is pivotally connected to a triangular link 81. The triangular link is pivotally supported at 82 on the stud planting arm 55 and is pivotally connected at 83 to a yoke 84 which is pivotally supported on bracket 84a mounted on the rear end of beam 8, the yoke 84 being adjustable by means of a lead screw 85 threaded in a block pivotally carried by bracket 84a. The lead screw 85 operated by crank 86 and yoke 84 replaces the adjusting mechanism 56 of FIGS. 1 and 2, and serves to change the angular position of the stud planting arm when in its stud planting position as well as to dispose it for clearance as above mentioned.

As may be seen by a comparison of FIGS. 16 and 17, when the stud transfer arm 38 moves from its stud planting position, FIG. 16, to its retracted position, FIG. 17, upon operation of the piston in cylinder 40 the link 80 rotates the triangular link 81 clockwise on the pivot 82 and clockwise also on pivot 83, thereby tilting the back end of the stud planting arm 55 upwardly and depressing its forward end to the position shown in FIG. 17.

(9) Interlocking Between Magazine, Stud Planting and Stud Transfer Mechanisms FIGS. 3, 4, 5 and 10

In order to prevent mechanical interference between the various parts, it is necessary to prevent operation of the stud planting mechanism unless the stud transfer arm is in its stud planting position. The interlock between the stud transfer mechanism and the stud planting mechanism is best seen in FIG. 10. The supply of air to the stud planting cylinder 58 is controlled by a valve 89 having a rotatable plug 89a which may be manually operated by means of a crank 90 (see FIG. 3). The valve plug 89a is rotatable inside a seat member 91 having a port 92 connected to an exhaust opening and a port 93 connected to an air supply conduit A. The plug 89a is rotatable from the position shown in FIG. 10, wherein air is supplied under pressure from supply line A through pipe B to the left-hand end of the cylinder 58, to a position displaced 90° counterclockwise from that shown in FIG. 10, wherein air under pressure is supplied from supply line A through pipe C to the right-hand end of cylinder 58. In the position shown, the stud planting cylinder 58 is operating, i.e., it is pushing the stud forward toward the electrode. When the valve plug 89a is operated to its other position 90° displaced from that shown in FIG. 10, the cylinder 58 retracts the stud driving mechanism. In these two positions of valve plug 89a the air is exhausted through the exhaust port 92 from the end of the cylinder 58 opposite to that to which the air under pressure is supplied.

The plug 89a moves concurrently with an outwardly projecting flange 89b, of generally circular form, but having an arcuate recess 89c formed in its periphery.

The supply of air to the cylinder 40 which drives the stud transfer arm is controlled by a valve 94 generally similar in structure to the valve 89, and including a cylindrical plug 95, which rotates within a cylindrical seat member 96 having ports connected respectively to the opposite ends of the cylinder 40 and to the air supply line A and to an air exhaust line 97. In the position of the valve 94 shown in FIG. 10, air is supplied under pressure through pipe 120 to the left-hand end of cylinder 40, while air is exhausted from the right-hand end through pipe 120a. The stud transfer arm is thereby maintained in its stud planting position. The plug 95 moves concurrently with a flange 98, of generally circular form, having a recess 98a formed in its periphery. The flanges 98 and 89b abut one another mechanically and, when the two valves 89 and 94 are in the positions shown in FIG. 10, the valve 94 cannot be moved, since its flange 98 is interlocked with the flange 89b at the recess 98a. The only movement then permitted is a movement of the valve 89 so as to move its plug 89a in a counterclockwise direction 90°, thereby controlling the cylinder 58 to retract the stud planting mechanism. After that movement of valve 89 has been accomplished, the valve 94 is freed of the interlock and can be moved 90° clockwise from the position of FIG. 10 to a position effective to retract the stud transfer arm. When the valve 94 is in stud transfer arm retracting position with the periphery of flange 98 engaged in recess 89c of valve 89, a notch 98b (see FIG. 3) on the periphery of flange 98 may be brought into register with one arm of a bell crank lever 100, which is biased out of the notch 98b by a spring 101. The other arm 100a of the bell crank lever carries on its end a tooth 102, FIG. 4, which may enter respective notches 103, FIG. 6, formed in the periphery of the magazine ring 25 and brought into register with the tooth 102 as the magazine is rotated. After the valve 94 has been moved to this stud transfer arm retracting position, the lever 100 may be moved upwardly into the notch 98b so as to withdraw the tooth 102 from the notches 103 and permit rotation of the magazine on the ball supports 26 to bring a new stud into register with the stud transfer arm. As long as the valve 94 is in the position for operating the stud transfer arm, the magazine is locked and cannot be rotated. A valve 120b may be placed in the pipe 120a for throttling the flow to control the speed of the transfer arm 38.

Figures 20, 21:
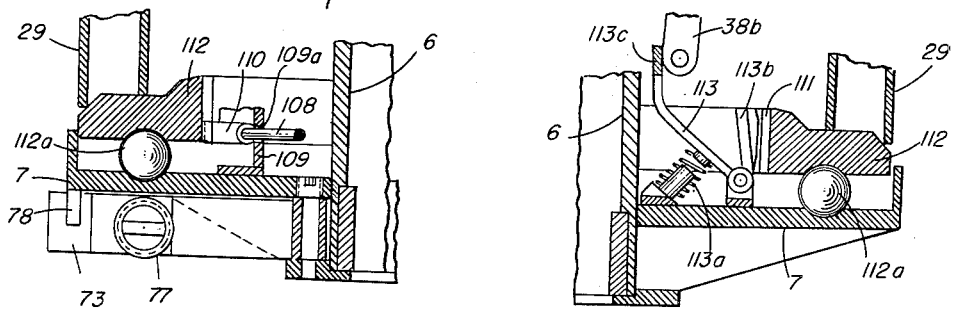
FIG. 20 is a cross-sectional view taken on the line XX—XX of FIG. 19.
FIG. 21 is a cross-sectional view taken on the line XXI—XXI of FIG. 19.

(10) Automatic Magazine Advancing Mechanism FIGS. 19, 21 and 22

These figures illustrate a mechanism for driving the magazine forward from one stud delivery position to the next by pneumatic motor means and for actuating that pneumatic motor means automatically, each time that the stud transfer arm moves to its retracted position.

There are shown in FIGS. 19 and 22 a pair of pneumatic cylinders 104, pivoted at their closed ends on pins 105 mounted on single brackets 106 fixed by suitable fasteners on the bracket ring 7. The cylinders 104 operate piston rods 108, which extend through slots 109a in guide plates 109 fixed to bracket ring 7 and carry on their free ends pawl members 110. The pawl members are formed at their outer ends to cooperate with notches 111 formed on the internal periphery of a magazine ring 112 which in this embodiment replaces the magazine ring 25 of FIGS. 1 to 18. The ring 112 is supported on bracket ring 7 by balls 112a running in race grooves formed in the rings 7 and 112.

A detent device comprises a support 114 fixed by suitable fasteners on the bracket 7 and a detent 115 pivoted on the support 114. A spring 115a biases the detent 115 outwardly toward a position of engagement with the notches 111. The detent device is provided to hold the angular position of the ring 112 fixed relative to the bracket 7 during retraction of the piston rods 108 into cylinders 104. The guide plates 109 guide the piston rods in their angular movement in the slots 109a concomitantly with the pivotal movement of the cylinders 104 on pins 105 during advance and retraction of the pawl members 110, the cylinders 104 swinging about their pins in FIGS. 19 and 22 as the rods 108 recede into the respective cylinders. The pawl members 110 are cammed out of the notches 111 which they have been engaging and then move into the next notch by engagement of the pawl members with the notch contour and with the plate surfaces.

A further interlock may be provided between the stud transfer arm and the magazine ring 112. As best seen in FIG. 20, a latch lever 113 is pivotally mounted on the bracket ring 7 and is biased in a clockwise direction by a helical spring 113a. The lever 113 carries a tooth 113b adapted to engage any of the notches 111 of the magazine ring 112. The upper end of lever 113 has a transverse part 113c for engagement by the lower end of the stud transfer arm 38b. When the stud transfer arm moves to its retracted position it engages the latch lever 113 and rotates it counterclockwise, FIG. 20, against the bias of spring 113a, so as to free the tooth 113b from the notch 111. The magazine ring 112 then may be rotated by the pneumatic cylinders 104.

Referring now to FIG. 22, there is shown an interlock between the cylinder 40 which drives the stud transfer arm, and the cylinders 104 which actuate the magazine advance mechanism. The plug 95 of valve 94 which controls the supply of air to the cylinder 40 also is connected to control the supply of air through a pair of lines 116 and 117 branched respectively from lines 120a, 120 connected respectively to the right hand and left ends of the cylinder 40, FIGS. 10 and 22. The lines 116 and 117 are connected to a reversing valve 118 connected to the cylinders 104. The line 116 is connected to line 120a through which the compressed air is delivered for operating the stud transfer arm to retracted position within the magazine. The line 116 has in it a sequence valve 119.

When the valve 94 is actuated to the position shown in the drawing, which is the position for moving the stud transfer arm to its retracted position, then air is supplied through the conduit 120a to the right hand end of the stud transfer arm cylinder 40. The pressure in the pipe 120a during this movement is relatively low and the sequence valve 119 biased to closed position prevents air from flowing into the cylinders 104 until the stud transfer arm has reached its retracted position. At that point the pressure of the air supplied from pipe A begins to build up in the cylinder 40 and in pipes 120a and 116 and becomes sufficient to open the sequence valve 119 against its bias, whereupon air is supplied through valve 118 in the setting shown to the closed ends of the cylinders 104, thereby driving their piston rods 108 outwardly, engaging the notches 111 and advancing the magazine ring 112 by an angular amount corresponding to the spacing between two stud receiving positions on the magazine. After the magazine has been so advanced, the operator will actuate the valve 94 through an angle of 90° so as to shift the transfer arm back to its operating position, delivering the pressure through line 120 to the left end of cylinder 40 and exhausting through line 120a from the right hand end of cylinder 40. The pressure also will be delivered through line 117 to the outer ends of cylinders 104 and the pawl members will be drawn back to positions to engage the next notches 111 ready for the next advance. When this shift is completed, the sequence valve 119 thereafter will not open to admit air to the cylinders 104 so as to operate them because of the low pressure in line 120a until the valve 94 again is operated to the position of FIG. 22. The pawl members, therefore, remain in register with the notches to which they were last moved and are not effective to move the magazine. When the valve 94 again is actuated to retract the stud transfer arm, the cylinders 104 again will be supplied with air through sequence valve 119 as soon as the retraction of the arm is completed.

The locking tooth 113b above described prevents any accidental operation of the magazine ring 112 by the cylinders 104 while the stud transfer arm is out of its retracted position.

The reversing valve 118 during regular transferring and planting operation remains held in the position shown in FIG. 22 by a biasing spring (not shown) and suitably connected to this valve. This valve, however, may be manually operated against the bias of the spring for loading of the magazine repeatedly to advance the magazine one step at a time without the necessity of actuating the stud transfer arm away from its retracted position.

FIG. 25 shows a modification of the apparatus for effecting vertical movement of the stud planting mechanism corresponding to the hydraulic and pneumatic cylinders described in connection with FIGS. 2 and 10 but utilizing mechanical means. Certain parts which are the same as in the previously described construction carry like reference numerals. In this modification the beam 8 is supported on the plate 12 carried at the top of the cylinder 6 to the lower end of which the platform or bracket 7 is secured, as in the embodiments of FIGS. 2 and 10. In FIG. 25 the bracket 7 is provided with a raceway for balls 112a, and the magazine ring 112 is supported on the balls 112a received in the raceway on this ring, this ring supporting the stud supports 29, as in FIGS. 20 and 21. The magazine thus is rotatable on the bracket as previously described.

The cylinder 6 is disposed in concentric relation to the cylinder 5 supported on the framing of the truck 1 similarly to the structure of FIGS. 1, 2 and 10. In place of the packing means 11a, FIGS. 2 and 10, in the embodiment of FIG. 25 guide rings 130, 131 are carried respectively at the upper end of the cylinder 5 and at the lower end of the cylinder 6 to provide for vertical movement of the cylinder 6 and the bracket 7 on the cylinder 5. The magazine, therefore, is movable on the cylinder 5 with bracket 7 as the beam 8 and the stud planting structure supported thereby are moved upwardly and downwardly to different stud planting positions.

In the embodiment of FIG. 25 the plate 11 of FIGS. 2 and 10 is replaced by a flanged ring 133 secured in the upper end of the cylinder 5 and providing a central opening through which the tubular support member 135 may pass, the upper end of the member 135 being secured by flange 137 and bolts 138 to the plate 12. The tubular member 135 extends downwardly within the cylinder 5 a distance corresponding to the desired lift of the stud planter to provide for movement of the tubular member axially with respect to a threaded spindle 141 disposed within the tubular member coaxially therewith. Adjacent the lower end of the tubular member 135 is secured a block 143, as by welding, in which is threaded the upper threaded end 145 of a nut 147 cooperating with the threaded spindle 141. The nut 147, shown partly broken away to reveal the threaded spindle, is further secured in the block 143 by set screws 149 set against a suitable surface formed on the threaded end 145 of the nut 147. It will be apparent that, upon turning movement of the threaded spindle 141, the nut 147 and the block 143 and the tubular member 135 supported thereon will be raised or lowered depending upon the direction of rotation of the spindle 141. The weight of the beam 8 carried by the plate 12 and of the stud planting structure supported by the beam 8, as previously described will be supported in the embodiment of FIG. 25 by the nut in threaded bearing relation to the spindle 141.

In FIG. 25 the nut 147 is shown in its lowermost position and in engagement with a lock nut 151 bearing on the upper end of a flanged sleeve 153 which carries inner races 155, 157 of two opposed roller bearings for taking the axial thrust of the spindle in either direction of its rotation. The respective outer races 159, 161 are supported in a housing 163 against shoulder 164, the housing 163 being provided at its lower end with a flange 165 bearing on the flange of a housing 167 supporting a bidirectional no-back clutch 169 of conventional construction. The housings 163, 167 are secured to the plate 171 of a cylindrical support member 173 disposed between the plate 171 and the flange of the housing 167 by bolts 175 tapped in the plate 171 and having the heads thereof bearing on the upper surface of the flange 165. The plate 171 is supported by cylinder 177 supported by the structure of the truck 1. It will be understood from this description that the weight of the beam 8 and the parts supported thereby is transmitted through the tubular member 135 to the nut 147 and is further transmitted through the threaded spindle 141 and the thrust bearing races to the housings 163, 167 and the cylinder 177 to the truck structure.

Secured to the plate 171 by bolts 181 is the casing of a reversible air motor 183. The shaft 185 of the motor 183 is connected to the input shaft of the reversible clutch 169 by coupling flange 187. The output shaft 189 of the clutch 169 is fitted in the lower end of the sleeve 153 and also is secured thereto by pin 191 driven through collar 192 carried on the sleeve 163, and through the output shaft 189.

The lower end of the spindle 141 at 195 is threaded in the upper end of the sleeve 153, the shouldered portion 197 of the spindle bearing on the upper face of the flange of the sleeve 153. This shouldered portion 197 is threaded for receiving the lock nut 151 above mentioned which locks the spindle 141 to the sleeve 153. The spindle 141 and the nut 147 preferably are of the ball bearing type in which a plurality of balls confined in the cylindrical sleeve of the nut in engagement with the semi-circular grooves of the thread of the spindle may move along the thread in rolling engagement therewith, this series of balls forming the thread of the nut. Upon rotation of the motor shaft 185 in a selected direction concomitantly with operation of the clutch 169 developing driving of the output shaft 189, sleeve 153 and spindle 141 will be rotated in the same direction and the nut will be moved along the spindle 141 upwardly or downwardly as the case may be. The tubular member 135 and the beam 8 and the structures supported thereby will be raised or lowered relative to the truck 1 and relative to the electrode for the various steps of the stud planting operation which have been described hereinabove.

The clutch 169 functions to provide for rotational movement of the output shaft 189 in either direction upon corresponding selective rotation of the shaft 185 by motor 183 upon the operation of suitable controls to be described. Clutch 169, however, is of such construction that, when no torque is applied to the input shaft 185 by the motor 183 and torque load is applied to the output shaft 189, the clutch operates as a brake to prevent rotation of the output shaft in either direction. Thus, when the screw 141 has been rotated to move the nut in the vertical direction to a position corresponding to the desired position of the stud planting mechanism, stopping of the motor 183 will bring into operation the braking action of the clutch 169 which will prevent rotation of the output shaft 189 and, therefore, of the threaded spindle 141. The nut 147 and the parts supported thereby, therefore, will be locked against vertical movement until the motor 183 again is operated in a selected direction.

It will be understood that rotation of the nut 147 must be prevented for proper operation to effect the vertical movement of the nut and of the parts supported thereby. Having regard to the locking of the bracket 7 in the positions to which it is rotated upon the vertical axis either for stud planting or for horizontal travel with the truck relative to the electrodes, as above described, it will be understood that rotation of cylinder 6 and, therefore, of the tubular member 135 and of the nut 147 secured thereto will be prevented, so that upon rotation of the spindle 141 vertical movement of the nut in the selected direction will be ensured.

In order to effect rotation of the input shaft 185 by the motor 183 a two-way valve 201 is supplied from a compressed airline 203 through check valve 205. The pipes 207, 209 are connected from respective ports of the valve 201 to the respective openings of the pneumatic motor 183. When the air is supplied under pressure through the pipe 207 to the motor 183 the exhaust is delivered from the motor through the pipe 209 and to the exhaust port 211 of the valve 201. This connection will effect rotation of the shaft 185 in a given direction, for example, in the clockwise direction viewed from the bottom of FIG. 25. Operation of the valve 201 to deliver the air under pressure through the pipe 209 will effect exhaust of the air from the motor through the pipe 207 and to the exhaust port of the valve 201. Such connection then will effect rotation of the shaft 185 in the counterclockwise direction viewed from the bottom of FIG. 25. In the embodiment as shown in FIG. 25 with a right thread on spindle 141 as shown, clockwise rotation of the shaft will effect lowering movement of the nut 147 and of the parts supported thereby. Counterclockwise rotation of the shaft 185 and spindle 141 will effect raising movement of the nut 147 and of the parts supported thereby.

It will be understood, therefore, that under control of the operator the apparatus of FIG. 25 provides for raising and lowering the stud planting mechanism and the magazine to any desired position and that this is accomplished by effecting respectively counterclockwise and clockwise rotation of the motor 183 and of the spindle 141, the bracket 7 and cylinder 6, as well as the tubular member 135 and nut 147 being held against rotation by the locking of the bracket 7 in the position to which it and the cylinder 6 carrying the beam 8 are rotated. Having regard to the characteristics of the clutch 169, such operations can be effected when the motor applies torque to the input shaft 185, the clutch 169 being capable of transmitting the torque in the proper direction to the output shaft 189 and to the spindle 141. When, however, the beam 8 has been raised or lowered to the desired position, upon stopping the motor and the input shaft 185 the clutch becomes effective to hold the output shaft 189 and the spindle 141 against rotation in either direction, so that the cylinder 6 and the beam 8 as well as the magazine carried on the bracket 7 are held in position against vertical movement. In any such position the cylinder 6 and beam 8 may be rotated on the vertical axis relative to the cylinder 5 to dispose the arms in operating or in traveling position, the nut 147 rotating through the same angle on the threads of spindle 141. The operation of the stud transfer and the stud planting mechanism which are carried by the beam 8 may be carried out as described in connection with the other embodiments.

While we have shown and described certain preferred embodiments of our invention, those skilled in the art will readily recognize that various changes may be made therein without departing from the scope of the invention. We therefore intend the invention to be limited only by the appended claims.

We claim:

1. A stud planter comprising a supporting structure, stud transfer means supported on said structure for movement thereof forwardly and reversely between a retracted position and a stud driving position in a path which includes a stud pick-up position, and driving means supported on said supporting structure for movement thereof along said path to adjust the stud driving position of said driving means and operable to engage and to drive a stud supported on said transfer means in said stud driving position of said transfer means.

2. A stud planter comprising a supporting structure, frame means mounted on said structure, a stud transfer arm mounted on the frame means and movable between a stud pick-up position and a stud driving position in which a stud carried on the transfer arm extends transversely of the vertical, and driving means supported on the frame means for movement thereof along the path of movement of said stud transfer arm to adjust the stud driving position of said driving means and operable for engaging and driving outwardly from the frame means said stud carried on the transfer arm at its stud driving position.

3. A stud planter as defined in claim 2 in which said supporting structure comprises means for supporting said frame means for rotation thereof on a vertical axis, means for releasably latching said frame means in an operating position wherein said transfer arm in its stud driving position extends transversely of said axis and transversely of a given horizontal dimension of said supporting structure, and means for releasably latching said frame means in a position angularly displaced about said vertical axis from said operating position thereof.

4. A stud planter as defined in claim 3, including strain relief means connected to said frame means and operable when said releasable latching means latches said frame means in said operating position, to permit yieldable swinging movement of the frame means with respect to the supporting structure on said vertical axis.

5. A stud planter comprising a supporting structure, stud transfer means supported on said supporting structure for movement thereof forwardly and reversely between a retracted position and a stud driving position in a path which includes a stud pick-up position, motor means supported on said structure and operatively connected to said stud transfer means for effecting said forward and reverse movements of said stud transfer means, and stud driving means supported on said supporting structure for movement thereof along said path of movement of said stud transfer means to adjust the stud driving position of said driving means, said stud driving means being operable for movement thereof relative to said stud transfer means forwardly and reversely between a retracted position in which said driving means is ineffective to drive said stud and an operating position in which said driving means engages and drives a stud supported on said transfer means at said stud driving position of said transfer means.

6. A stud planter as defined in claim 5, including second motor means operatively connected to said driving means for actuating said driving means, and an interlock between said two motor means to prevent actuation of the stud driving means except when the transfer means is in said stud driving position thereof and to prevent actuation of said transfer means toward its driving position except when the stud driving means is in its retracted position.

7. A stud planter comprising a frame, a magazine for carrying studs mounted on said frame, a stud transfer arm mounted on the frame and movable in a given path between a retracted position adjacent the magazine and a stud driving position spaced from the magazine, and driving means supported on said frame for movement thereof along said path to adjust the stud driving position of said stud driving means and operable for engaging and driving a stud supported on the transfer arm at said stud driving position.

8. A stud planter comprising a frame, a magazine for carrying studs mounted on said frame, a stud transfer arm mounted on the frame and movable between a retracted position adjacent the magazine and a stud driving position spaced from the magazine, and driving means supported on the frame and operable for engaging and driving a stud supported on the transfer arm at said stud driving position, said magazine comprising a plurality of spaced stud supports, the two stud supports of each of the consecutively adjacent pairs of supports defining a stud-receiving space between them, means for moving said pairs of supports along a path transverse to the path of movement of the transfer arm in succession through a stud-delivering position in which said stud-receiving spaces are successively in register with the transfer arm, said transfer arm being supported so that upon movement thereof from said retracted position toward said stud driving position said arm will pass between the supports of a pair of said supports in said stud delivering position and will pick up a stud stored there and transfer it to said driving position.

9. A stud planter comprising a frame, a magazine for carrying studs mounted on said frame, a stud transfer arm mounted on the frame and movable between a retracted position adjacent the magazine and a stud driving position spaced from the magazine, and driving means supported on the frame and operable for engaging and driving a stud supported on the transfer arm at said stud driving position, said magazine being supported for movement thereof to move the studs carried thereby in succession through a stud delivering position in which the stud is in register with said transfer arm, said transfer arm being supported for movement thereof through said stud delivering position in the movement thereof toward said stud driving position so as to pick up the stud and to transfer it to said stud driving position, and means interlocking said transfer arm and said magazine to prevent movement of the magazine except when said arm is in its retracted position and to prevent movement of the arm while the magazine is moving to move said studs in succession through said stud delivering position.

10. A stud planter as defined in claim 9 including first motor means for actuating the transfer arm, second motor means for advancing the magazine, and means in said interlocking means biased to block supply of power to said second motor means which would effect advance of the magazine except when said first motor means is powered to actuate said transfer arm to said retracted position.

11. A stud planter as defined in claim 10 in which both motor means are pneumatic and reversible and said power supply blocking means includes a compressed air supply line, and a biased valve in a connection between said supply line and said second motor means and operable against its bias for flow of air therethrough to said second motor means at a pressure sufficient to operate said first motor means to actuate said transfer arm to said retracted position thereof.

12. A stud planter as defined in claim 9, including reversible motor means for actuating said transfer arm between said retracted and stud driving positions, control means for said reversible motor means including a manual control member movable between two positions corresponding respectively to the retracted position and the stud-driving position of said transfer arm, and interlocking means cooperating with the transfer arm control means and with the magazine and movable between a first position in which it locks the control means in the position corresponding to the retracted position of the transfer arm and the magazine is free to move and a second position in which it locks the magazine in any of its stud-delivering positions and the control means is free to move to its other position to cause actuation of the transfer arm to its stud-driving position.

13. A stud planter comprising a frame, a magazine for carrying studs mounted on said frame, a stud transfer arm mounted on the frame and movable between a retracted position adjacent the magazine and a stud driving position spaced from the magazine, and driving means supported on the frame and operable for engaging and driving a stud supported on the transfer arm at said stud driving position, said magazine being supported for movement thereof to move the studs carried thereby in succession through a stud delivering position in which the stud is in register with said transfer arm, said transfer arm being supported for movement thereof through said stud delivering position in the movement thereof toward said stud driving position so as to pick up the stud and to transfer it to said stud driving position, a latch operable to hold the magazine in any of its stud delivering positions, and means actuated upon movement of the transfer arm to its retracted position for releasing said latch to permit said movement of said magazine.

14. A stud planter, comprising an upright central support member, frame means mounted on the support member comprising bracket means extending transversely of the vertical and circumferentially about and adjacent the lower end of the support member, and a beam extending transversely of the vertical outwardly from the upper end of said support member; a magazine for carrying studs comprising a ring encircling said support member and rotatably supported on said bracket means, and a plurality of spaced generally vertical stud supports fixed on said ring, the two supports of each of the consecutively adjacent pairs of supports defining a stud receiving space between them; a planting arm pivotally mounted on said beam, stud driving means mounted on said arm for slidable movement along said planting arm, motor means mounted on said planting arm for actuating said stud driving means; a stud transfer arm pivotally mounted on the beam and movable between a retracted position where it is disposed inside the magazine ring, through a stud pick-up position where it is disposed in one of the stud-receiving spaces of the ring, to a stud planting position wherein a stud carried by said transfer arm is aligned with the stud driving means on the planting arm; and second motor means supported by said beam for actuating said stud transfer arm forwardly and reversely between said retracted position of said arm and said stud planting position thereof.

15. A stud planter as defined in claim 14, in which each of said two vertical stud supports of said pairs carries a spring member adapted resiliently to engage a stud disposed in said stud receiving space defined between said two supports of each pair to hold said stud releasably therein.

16. A stud planter as defined in claim 14 for studs having thereon guide engaging means, said planter comprising guides supported on said stud supports for engagement by said guide engaging means to hold the said studs in a predetermined orientation with respect to said stud supports.

17. A stud planter as defined in claim 14 for studs having thereon guide engaging means, said planter comprising means supported by said beam for supporting guide members so as to be disposed at the respective sides of the path of movement of the stud transfer arm for engaging said guide engaging means of said studs to hold said studs in a predetermined orientation with respect to said arm during movement of the stud to said stud-driving position.

18. A stud planter comprising a magazine including a stud holder, a stud transfer arm movable between a retracted position through a stud pick-up position to a stud driving position, said magazine being movable into a stud delivery position wherein a stud carried by said holder is in the path of the transfer arm at its pick-up position, a fork pivotally mounted on said transfer arm, said fork being movable between a stud freeing position and a stud retaining position, a latch member mounted on said arm and movable between a fork latching position wherein it holds the fork in its stud retaining position and a fork releasing position wherein it allows the fork to move to its stud freeing position, means biasing the latch member to its fork latching position, means effective as the arm approaches its retracted position to move the fork to its stud retaining position, said latch member then being effective to hold said fork in its stud retaining position as the arm moves through its pick-up position toward said stud driving position so that said fork and said transfer arm cooperate to pick up the stud from the stud holder and to move the stud to the stud driving position, and means effective as the arm approaches the stud driving position to move the latch member to its fork releasing position to release said fork to move to said stud freeing position.

19. A stud planter, comprising a support, a planting arm mounted on said support for pivotal movement thereof on an axis, means for adjusting the angular position of said planting arm on said axis with respect to said support, a stud transfer arm mounted on said support for pivotal movement thereof on said axis, and motor means for effecting said pivotal movement of said stud transfer arm including a piston and cylinder assembly pivoted adjacent one end of said assembly on said planting arm and adjacent the opposite end of said assembly pivotally connected to said stud transfer arm, said motor means being operable pivotally to move said stud transfer arm between a retracted position wherein it is spaced from the planting arm and a stud planting position wherein it is substantially aligned with the planting arm in any angularly adjusted position of said planting arm about said axis.

20. A stud planter, comprising a support, a planting arm mounted on said support for pivotal movement thereof on an axis, a stud transfer arm mounted on said support for pivotal movement thereof on said axis, motor means for effecting said pivotal movement of said stud transfer arm including a piston and cylinder assembly pivoted adjacent one end of said assembly on said planting arm and adjacent its opposite end pivotally connected to said stud transfer arm, said motor means being operable pivotally to move said stud transfer arm between a retracted position wherein it is spaced from the planting arm and adjacent said support member and a stud planting position wherein it is substantially aligned with a portion of the planting arm disposed outwardly from said pivotal axis, and a linkage connecting said stud transfer arm at a point thereon spaced from said pivotal axis to said planting arm at a point thereon spaced from said pivotal axis, said linkage being effective when said stud transfer arm moves to its retracted position to cause a following but smaller movement of the stud planting arm, thereby to reduce the extension of said outer portion of said planting arm beyond said support.

21. A stud planter as defined in claim 20, in which said linkage comprises a triangular link having first, second and third pivots, means mounted on said support for adjusting the position of said first pivot relative to said support, said second pivot providing a connection between said triangular link and said planting arm, and a second link connecting said third pivot to said stud transfer arm.

22. A stud planter, comprising a vertical central support member, frame means mounted on said support member comprising bracket means extending transversely of the vertical and outwardly from and circumferentially about and adjacent the lower end of said support member, and a beam extending transversely of the vertical outwardly from the upper end of said support member; a magazine for carrying studs comprising a ring encircling said support member and supported on said bracket means for rotation on a generally vertical axis, and a plurality of vertically disposed stud supports spaced about said axis and fixed on said ring, the two supports of each of consecutively adjacent pairs of said supports defining a stud receiving space between them; a planting arm pivotally mounted on said beam outwardly from said support member and extending transversely of the vertical outwardly with respect to said support member, stud driving means mounted on and for slidable movement along said planting arm; a stud transfer arm pivotally mounted on said beam outwardly from said support member and pivotally movable between a retracted position where it extends substantially vertically and is inside said magazine ring, through a stud pick-up position where it is in one of said stud-receiving spaces between said stud supports, to a planting position wherein a stud carried by said transfer arm is aligned with said stud driving means on said planting arm; motor means supported by said beam for effecting movement of said stud transfer arm between said positions thereof; and motor means for advancing the magazine to move consecutive stud-receiving spaces thereof successively to said stud pick-up positions wherein the consecutive stud receiving spaces are in register with the retracted position of said transfer arm, said magazine advancing motor means comprising a piston and cylinder assembly pivoted at one end on said bracket means, a guide on said bracket means for slidably receiving an intermediate portion of said assembly in the movement thereof, and a pawl on the other end of said assembly, said ring having notches formed therein for receiving said pawl to effect rotation of said ring and said magazine upon operation of said magazine advancing motor means.

23. Apparatus for driving a stud into a self-baking electrode having a metallic sheath and a relatively soft interior, comprising a guide for supporting the stud in a driving position with one end directed toward the electrode and for movement of said stud lengthwise thereof relative to said guide, a pusher engageable with the other end of the stud, steady force applying means for moving the pusher and the stud along the guide to bring said one end of the stud into engagement with the electrode sheath, and impact means operable to apply repeated blows to said other end of the stud to continue lengthwise movement of said stud into said electrode.

24. Apparatus for driving an elongated pin longitudinally along a path which includes a penetrable body developing resistance to movement of the pin, comprising a guide for the pin, a pusher engageable with a given end of the pin as said pin is guided by said guide, steady force applying means for moving the pusher and the pin along the guide, so that the opposite end of the pin engages said body, and impact means effective when the pin engages the body to apply repeated hammer blows to said given end of the pin.

25. Apparatus as defined in claim 24, in which said steady force applying means is a pneumatic motor comprising a cylinder, a piston movable in said cylinder, and means connecting the piston to said pusher, said impact means being provided by a pneumatic riveting hammer, said connecting means comprising said pneumatic hammer, and air supply means for the riveting hammer including a conduit connected to an inlet opening into the end of the cylinder which is supplied with air when the pin is being pushed and connected to the pneumatic riveting hammer to deliver air thereto.

26. A stud planter comprising a supporting structure, stud transfer means supported on said structure for movement thereof forwardly and reversely between a retracted position and a stud driving position in a path which includes a stud pick-up position, said transfer means in each of said positions disposing the stud with its length in a given plane, and driving means supported on the supporting structure for movement thereof in said given plane along said path to adjust the stud driving position of said driving means and operable in said stud driving position to engage and to drive a stud supported on said transfer means.

27. A stud planter comprising a supporting structure, frame means mounted on said structure for rotational movement thereof on a vertical axis relative to said structure, stud transfer means mounted on said frame means for movement of said transfer means to move said stud in a vertical plane between a stud pick-up position and a stud driving position in which a stud carried on said transfer means is disposed with its length extending transversely of the vertical, and driving means supported on said frame means for movement thereof in said plane to adjust the stud driving position of said driving means and operable for engaging and driving lengthwise thereof and outwardly from said frame means said stud carried on said transfer means at its stud driving position.

28. A stud planter comprising a supporting structure, stud transfer means supported on said structure for movement thereof forwardly and reversely between a retracted position and a stud driving position in a path which includes a stud pick up position, said transfer means in each of said positions disposing a stud carried by said transfer means with its length generally in the vertical plane, said stud in said stud driving position extending transversely of the vertical, and means operatively connected to said stud transfer means for effecting upward and downward movement of said stud transfer means with respect to said supporting structure to adjust the level of said pick up position and the level at which said stud is disposed in said driving position thereof.

References Cited in the file of this patent

UNITED STATES PATENTS

| | | |
|---|---|---|
| 201,017 | Jordan | Mar. 5, 1878 |
| 1,273,902 | Muller | July 30, 1918 |
| 1,609,227 | Vann | Nov. 30, 1926 |
| 1,898,376 | McCulloch | Feb. 21, 1933 |
| 2,320,953 | Shenstone | June 1, 1943 |
| 2,335,172 | Cornett | Nov. 22, 1943 |
| 2,493,212 | Zimmermann | Jan. 3, 1950 |
| 2,617,098 | Lenart | Nov. 11, 1952 |
| 2,648,841 | Smith | Aug. 18, 1953 |
| 2,660,724 | Thompson | Dec. 1, 1953 |
| 2,732,554 | Knott | Jan. 31, 1956 |
| 2,742,257 | Hatt | Apr. 17, 1956 |
| 2,830,294 | Falken | Apr. 15, 1958 |
| 2,856,998 | Hancock | Oct. 21, 1958 |
| 2,874,392 | Campione | Feb. 24, 1959 |
| 2,926,352 | Dalin | Mar. 1, 1960 |